US 9,253,656 B2

(12) United States Patent
Kwon et al.

(10) Patent No.: US 9,253,656 B2
(45) Date of Patent: Feb. 2, 2016

(54) SIGNAL TRANSMISSION METHOD AND SYSTEM FOR TRANSMITTING SIGNAL BY USING INTERFERENCE CONTROL METHOD AND/OR TRANSMISSION POWER CONTROL METHOD

(71) Applicant: Samsung Electronics Co., Ltd., Suwon-si (KR)

(72) Inventors: Tae Soo Kwon, Hwaseong-si (KR); Kyung Hun Jang, Suwon-si (KR); Young-Doo Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 120 days.

(21) Appl. No.: 13/764,278

(22) Filed: Feb. 11, 2013

(65) Prior Publication Data
US 2013/0157705 A1    Jun. 20, 2013

Related U.S. Application Data

(62) Division of application No. 12/547,535, filed on Aug. 26, 2009.

(30) Foreign Application Priority Data

Mar. 3, 2009  (KR) .................. 10-2009-0017904

(51) Int. Cl.
*H04L 25/03*    (2006.01)
*H04W 24/02*   (2009.01)
(Continued)

(52) U.S. Cl.
CPC ........... *H04W 24/02* (2013.01); *H04J 11/0026* (2013.01); *H04L 5/006* (2013.01); *H04L 5/0037* (2013.01); *H04L 5/0053* (2013.01);
(Continued)

(58) Field of Classification Search
CPC .................... H04L 5/0037; H04W 52/243
USPC .......................................... 455/501
See application file for complete search history.

(56) References Cited

U.S. PATENT DOCUMENTS 5,983,113 A     11/1999  Asanuma
2007/0207828 A1  9/2007  Cheng et al.
(Continued)

FOREIGN PATENT DOCUMENTS

EP     1 617 691 A1    1/2006
JP     2008-079262 A   4/2008
(Continued)

OTHER PUBLICATIONS

Samsung. "Further discussion on Inter-cell Interference Mitigation through Limited Coordination." 3GPP TSG RAN WG1 Meeting #55, Prague, Czech Republic, Nov. 10-14, 2008, Agenda item 114, Document for Discussion and Decision, R1-084173.
(Continued)

*Primary Examiner* — David Bilodeau
(74) *Attorney, Agent, or Firm* — NSIP Law

(57) ABSTRACT

Provided are a signal transmission method and a network apparatus to control interference in a radio communication network. A terminal may transmit to the network apparatus, signal quality information associated with a radio channel formed between the terminal and a corresponding base station. The corresponding base station may output a signal received by the plurality of terminals, based on the signal quality information.

18 Claims, 13 Drawing Sheets

(51) Int. Cl.
*H04J 11/00* (2006.01)
*H04L 5/00* (2006.01)
*H04W 52/24* (2009.01)
*H04L 25/02* (2006.01)
*H04W 52/14* (2009.01)

(52) U.S. Cl.
CPC ........... *H04L5/0057* (2013.01); *H04W 52/243* (2013.01); *H04L 25/0228* (2013.01); *H04L 25/03343* (2013.01); *H04L 2025/03802* (2013.01); *H04W 52/143* (2013.01); *H04W 52/247* (2013.01)

(56) References Cited

U.S. PATENT DOCUMENTS

| | | | |
|---|---|---|---|
| 2008/0090575 A1* | 4/2008 | Barak et al. | 455/444 |
| 2008/0268833 A1 | 10/2008 | Huang et al. | |
| 2009/0082027 A1* | 3/2009 | Yavuz et al. | 455/446 |
| 2009/0264076 A1* | 10/2009 | Nogami et al. | 455/63.1 |
| 2009/0325496 A1 | 12/2009 | Ohm et al. | |
| 2010/0029212 A1 | 2/2010 | Malladi et al. | |
| 2010/0190447 A1 | 7/2010 | Agrawal et al. | |
| 2011/0085536 A1 | 4/2011 | Taoka et al. | |

FOREIGN PATENT DOCUMENTS

| | | |
|---|---|---|
| KR | 10-2004-0075367 A | 8/2004 |
| KR | 10-2006-0037572 A | 5/2006 |
| KR | 10-2007-0071315 A | 7/2007 |
| KR | 10-0768327 B1 | 10/2007 |
| WO | WO-03/034610 A2 | 4/2003 |
| WO | WO 2007/034700 A1 | 3/2007 |
| WO | WO 2009/039443 A2 | 3/2009 |

OTHER PUBLICATIONS

Yeh, Choong II, et al. "Frame Structure to Support Inter-cell Interface Mitigation for Downlink Traffic Channel using Co-MIMO and FFR." IEEE 802.16 Broadband Wireless Access Working Group, IEEE C802.16m-08/17, Dec. 1, 2007.

Search Report dated Dec. 16, 2011, in corresponding International Patent Application No. PCT/KR/006115.

Extended European Search Report issued Sep. 6, 2013 in counterpart European Application No. 09841207.5 (8 pages, in English).

Japanese Office Action issued Nov. 19, 2013 in counterpart Japanese Application No. 2011-552871 (3 pages, in Japanese).

* cited by examiner

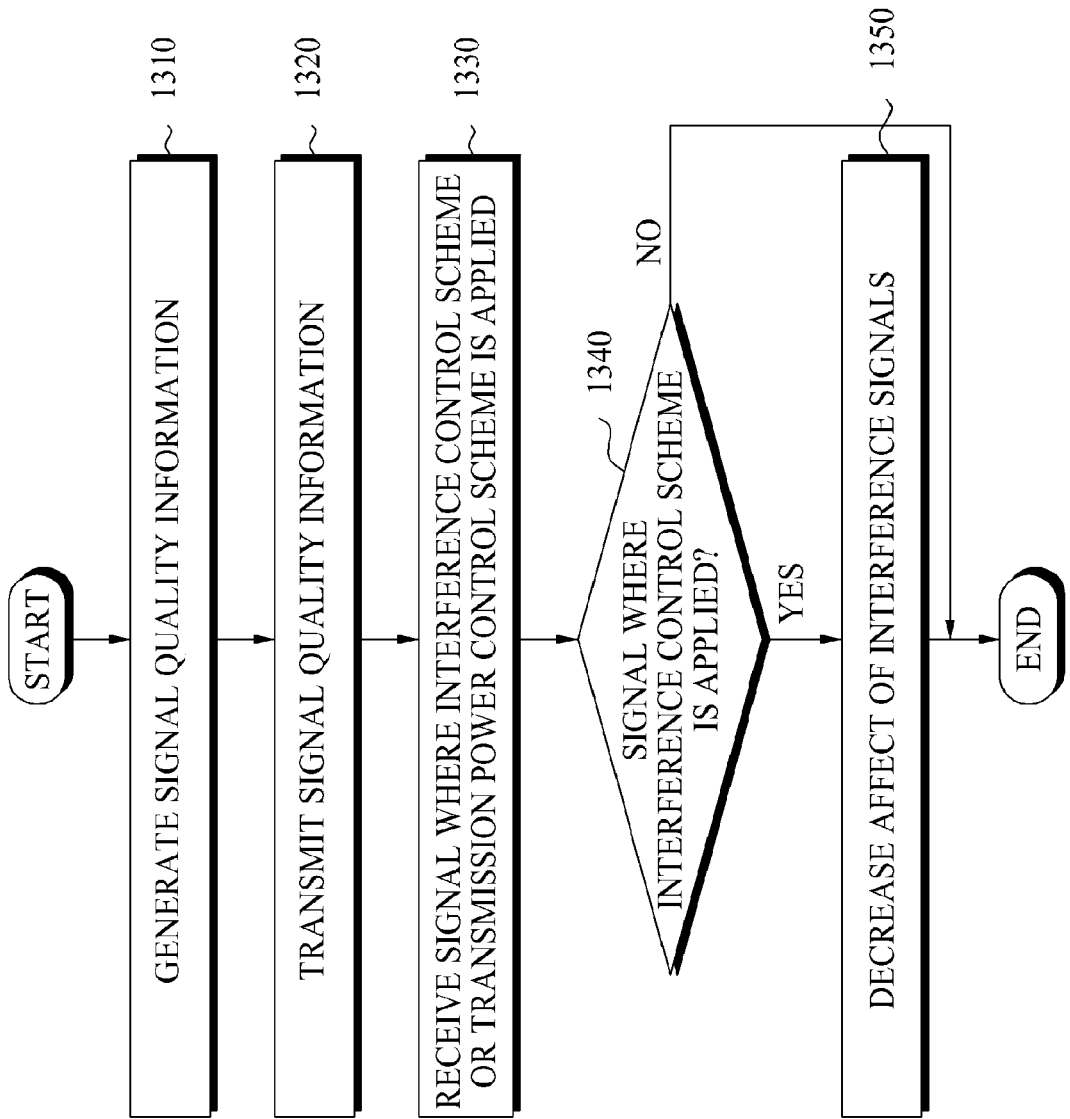

SIGNAL TRANSMISSION METHOD AND SYSTEM FOR TRANSMITTING SIGNAL BY USING INTERFERENCE CONTROL METHOD AND/OR TRANSMISSION POWER CONTROL METHOD

CROSS-REFERENCE TO RELATED APPLICATION(S)

This application is a division of U.S. patent application Ser. No. 12/547,535, filed on Aug. 26, 2009, currently pending, which claims the benefit under 35 U.S.C. §119(a) of a Korean Patent Application No. 10-2009-0017904, filed on Mar. 3, 2009, in the Korean Intellectual Property Office, the entire disclosure of which is incorporated herein by reference for all purposes.

BACKGROUND

1. Field

The following description relates to a technology to decrease the effect of interference in a radio communication environment.

2. Description of Related Art

Signals may be transmitted using a radio communication network and the amount of signals transmitted is expected to grow in the near future. It is expected that a need will arise to transmit much more signals than currently being transmitted by the radio communication network.

A radio communication network may include a plurality of base stations and a plurality of terminals served by the plurality of base stations. A terminal may receive interference signals from base stations that are adjacent to a base station that may transmit a signal desired by the terminal. The interference signals may deteriorate the transmission efficiency of the radio communication network. Accordingly, there is a need for a technology that may address the interference signals.

SUMMARY

In one general aspect, a network apparatus includes a receiver configured to receive signal quality information associated with each of a plurality of terminals that are included in a communication network having a base station, and a decision unit configured to determine whether to apply an interference control scheme to a signal output by the base station that is received by the plurality of terminals, based on the signal quality information.

The communication network may include a plurality of base stations and the signal quality information with respect to a designated terminal among the plurality of terminal to receive the signal may be calculated based on at least one of a gain of a signal channel formed between the base station and the plurality of terminals, a signal transmission power of the base station, a gain of an interference channel formed between each base station among the plurality of base stations acting as an interference base station and the plurality of terminals, an interference signal transmission power of each interference base station, and a noise power of the plurality of terminals.

The interference control scheme may be one of an interference alignment scheme, an interference neutralization scheme, an interference cancellation scheme, and an interference treated as noise scheme.

The base station may control a phase of the signal.

In response to the signal quality information being greater than or equal to a predetermined reference value, the decision unit may determine to apply the interference control scheme to the signal.

In response to at least two interference signals being received by the plurality of terminals, the decision unit may determine to apply the interference control scheme to the signal.

In response to the decision unit determining to not apply the interference control scheme to the signal, the base station may output the signal by applying a transmission power control scheme to the signal.

The decision unit may determine to apply the interference control scheme to the signal, and the base station may further apply a transmission power control scheme to the signal to which the interference control scheme is applied.

In another general aspect, a network apparatus includes a selection unit configured to select at least one of an interference control scheme and a transmission power control scheme with respect to a plurality of terminals that are included in a communication network having a base station, and a signal transmitter configured to output a signal received by the plurality of terminals, according to a control of the selection unit.

The network apparatus may further include a radio resource management unit configured to manage radio resources that are pre-allocated to apply the interference control scheme and radio resources that are pre-allocated to apply the transmission power control scheme, wherein the selection unit may select at least one of the interference control scheme and the transmission power control scheme by referring to the radio resource management unit.

The transmission power control scheme may be further applied to the radio resources that are pre-allocated to apply the interference control scheme.

The interference control scheme may be one of an interference alignment scheme, an interference neutralization scheme, an interference cancellation scheme, and an interference treated as noise scheme.

The base station may control a phase of the signal.

The network apparatus may be included in a base station control unit.

In still another aspect, a terminal includes a receiver configured to receive, from a corresponding base station and a plurality of base stations acting as interference base stations, a signal and interference signals that are output using at least one of an interference control scheme and a transmission power control scheme, and a signal quality information generation unit configured to generate signal quality information to be transmitted to the corresponding base station, wherein the signal from the corresponding base station is a signal to which at least one of the interference control scheme and the transmission power control scheme is applied based on the signal quality information.

The interference control scheme may be one of an interference alignment scheme, an interference neutralization scheme, an interference cancellation scheme, and an interference treated as noise scheme.

A phase of the main signal may be controlled.

In still another aspect, a method of transmitting a radio signal in a communication network, includes receiving signal quality information associated with each of a plurality of terminals that are included in the communication network having a base station, and determining whether to apply an interference control scheme to a signal output by the base station that is received by the plurality of terminals, based on the signal quality information.

The communication network may include a plurality of base stations and the signal quality information with respect to a designated terminal among the plurality of terminals to receive the signal may be calculated based on at least one of a gain of a signal channel formed between the base station and the plurality of terminals, a signal transmission power of the base station, a gain of an interference channel formed between each base station among the plurality of base stations acting as an interference base station and the plurality of terminals, an interference signal transmission power of each interference base station, and a noise power of the plurality of terminals.

The interference control scheme may be one of an interference alignment scheme, an interference neutralization scheme, an interference cancellation scheme, and an interference treated as noise scheme.

The base station may control a phase of the signal.

The determining may include determining to apply the interference control scheme to the signal in response to the signal quality information being greater than or equal to a predetermined reference value.

The determining may include determining to apply the interference control scheme to the signal in response to at least two interference signals being received by the plurality of terminals.

The method may further include outputting the signal by applying a transmission power control scheme to the signal in response to determining to not apply the interference control scheme to the signal.

The method may further include outputting the signal, wherein the outputting of the signal may include applying the interference control scheme to the signal in response to determining to apply the interference control scheme, and applying a transmission power control scheme to the signal to which the interference control scheme is applied.

In still another aspect, a method of transmitting a radio signal in a communication network, includes selecting at least one of an interference control scheme and a transmission power control scheme with respect to a plurality of terminals that are included in of the communication network having a base station, and outputting a signal received by the plurality of terminals using the selected control scheme.

The method may further include managing radio resources that are pre-allocated to apply the interference control scheme and radio resources that are pre-allocated to apply the transmission power control scheme, wherein the selecting may include selecting at least one of the interference control scheme and the transmission power control scheme by referring to the pre-allocated radio resources.

The outputting of the signal may include further applying the transmission power control scheme to the radio resources that are pre-allocated to apply the interference control scheme.

The interference control scheme may be one of an interference alignment scheme, an interference neutralization scheme, an interference cancellation scheme, and an interference treated as noise scheme.

The outputting of the signal may include controlling a phase of the signal.

In still another aspect, a method of receiving a radio signal, includes receiving, from a corresponding base station and a plurality of base stations acting as interference base stations, a signal and interference signals that are output using at least one of an interference control scheme and a transmission power control scheme, and generating signal quality information to be transmitted to the corresponding base station, wherein the signal from the corresponding base station is a signal to which at least one of the interference control scheme and the transmission power control scheme is applied to based on the signal quality information.

The interference control scheme may be one of an interference alignment scheme, an interference neutralization scheme, an interference cancellation scheme, and an interference treated as noise scheme.

A phase of the main signal may be controlled.

In still another aspect, a signal processing method for a radio communication network having a plurality of base stations and a plurality of terminals, includes determining a first radio resource region to apply an interference control scheme, based on states of radio channels formed between the plurality of base stations and the plurality of terminals, determining a second ratio resource region to apply a transmission power control scheme, applying the interference control scheme to a signal corresponding to the first radio resource region, and applying the transmission power control scheme to a signal corresponding to the second radio resource region.

An aggregate of the first radio resource region and the second radio resource region may be the entire radio resource region that is allocated to the radio communication network.

The first radio resource region may not overlap with the second radio resource region.

The first radio resource region may at least partially overlap with the second radio resource region.

Other features and aspects will be apparent from the following detailed description, the drawings, and the claims.

BRIEF DESCRIPTION OF THE DRAWINGS

FIG. 13 is a flowchart illustrating an exemplary method of operating a terminal to receive a transmission signal that is transmitted using at least one of an interference control scheme and a transmission power control scheme.

Figure 1:
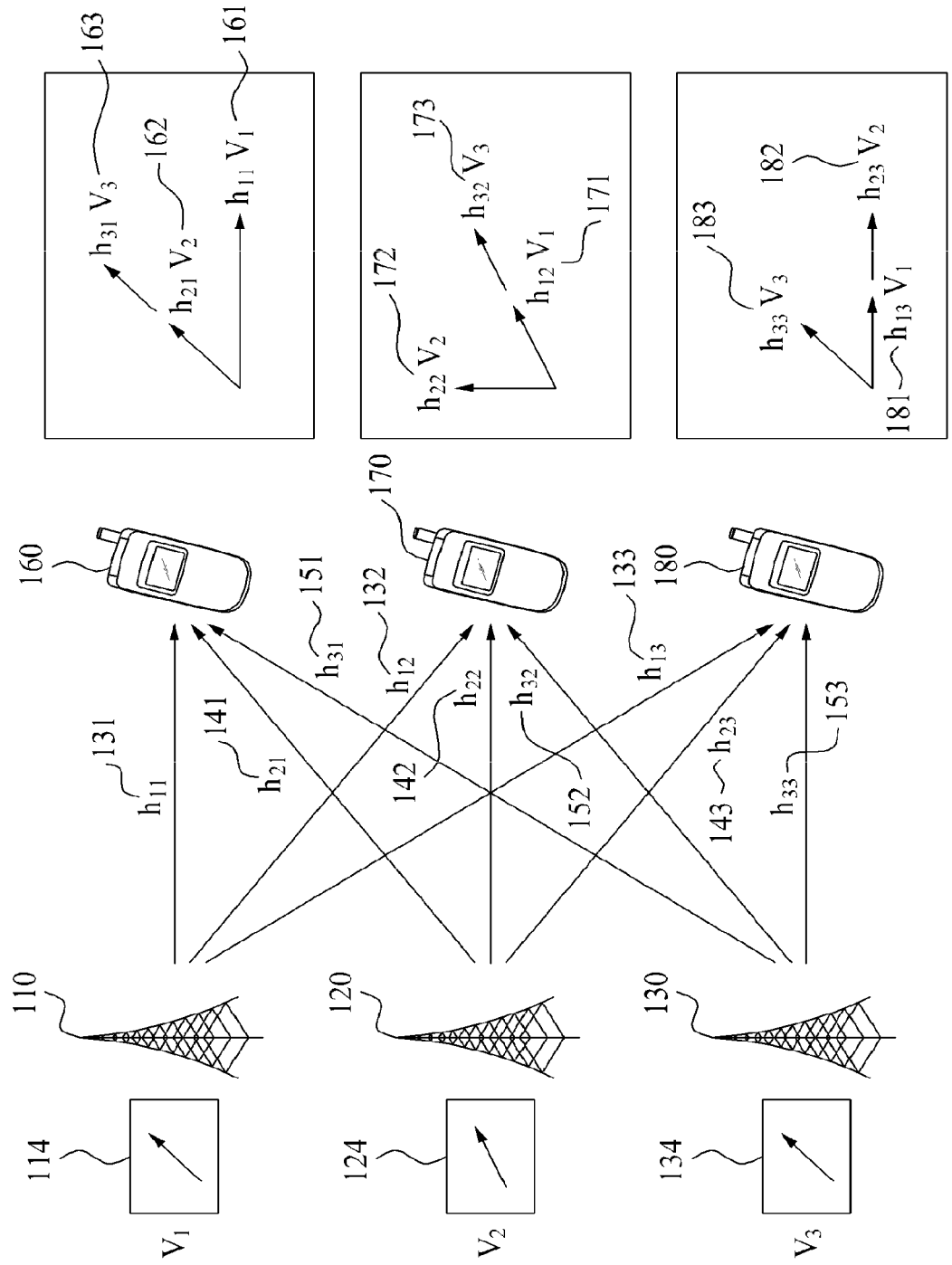
FIG. 1 is a diagram illustrating an exemplary interference control scheme.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Interference may restrict communication capacity of a system that includes multiple transmission/reception ends such as, for example, a multi-cell system. A scheme of using different frequency bands between neighboring cells typically divides the allocated radio resources for use, and may restrict the capacity.

Accordingly, an interference control scheme may be utilized that may use all the radio resources that are allocated to each of the transmission/reception ends, so as to decrease the effect of interference signals. The interference control scheme may use, for example, an interference alignment scheme, an interference neutralization scheme, an interference cancellation scheme, an interference treated as noise (ITN) scheme, and the like.

Hereinafter, a scheme to decrease the effect of interference signals by selectively applying or by simultaneously applying an interference control scheme and a transmission power control scheme, for example, a dynamic spectrum management (DSM) scheme will be further described.

<Interference Control Scheme>

FIG. 1 illustrates an exemplary interference control scheme.

FIG. 1 illustrates a radio communication network or a radio communication system that includes a plurality of base stations 110, 120, and 130, and a plurality of terminals 160, 170, and 180. The base station 110 and the terminal 160 may constitute a pair to transmit/receive a signal. The base station 120 and the terminal 170 may constitute a pair to transmit/receive a signal. The base station 130 and the terminal 180 may constitute a pair to transmit/receive a signal.

Referring to FIG. 1, a signal transmitted from the base stations 110, 120, and 130 may be transmitted to undesignated terminals aside from a corresponding designated terminal. For example, a signal transmitted from the base station 110 may be received by the designated terminal 160 and may also be received by the undesignated terminals 170 and 180. The terminal 160 may receive a desired signal transmitted from the base station 110 and may also receive undesired or unexpected signals transmitted from the base stations 120 and 130. Here, among the signals received by each of the terminals 160, 170, and 180, the desired signal may be referred to as a main signal and the undesired or unexpected signal may be referred to as an interference signal. A base station that transmits the main signal to the terminals 160, 170, and/or 180 may be referred to as a main base station, and a base station that transmits the interference signal to the terminals 160, 170, and/or 180 may be referred to as an interference base station. For example, in the case of the terminal 160, the base station 110 may be the main base station, and the base stations 120 and 130 may be the interference base stations.

According to an aspect, each base station may control a transmission signal to thereby decrease the effect of interference signals in each corresponding terminal. The transmission signal may be controlled based on a state of a radio channel that is formed between each base station and each terminal, or radio channel states formed between base stations and terminals in question.

Referring to back to FIG. 1, a phase of a signal $V_1$ 114 transmitted from the base station 110 may change while passing through a radio channel $h_{11}$ 131 formed between the base station 110 and the terminal 160. The terminal 160 may receive a main signal $h_{11}V_1$ 161 of which a phase is changed while the signal $V_1$ 114 passes through the radio channel $h_{11}$ 131. Also, the terminal 160 may receive an interference signal $h_{21}V_2$ 162 of which a phase is changed while a signal $V_2$ 124 transmitted from the base station 120 passes through a radio channel $h_{21}$ 141, and an interference signal $h_{31}V_3$ 163 of which a phase is changed while a signal $V_3$ 134 transmitted from the base station 130 passes through a radio channel $h_{31}$ 151. In this case, due to the interference signal $h_{21}V_2$ 162 and the interference signal $h_{31}V_3$ 163, a reception efficiency of the main signal $h_{11}V_1$ 161 may be deteriorated in the terminal 160. Similarly, due to an interference signal $h_{12}V_1$ 171 and an interference signal $h_{32}V_3$ 173, a reception efficiency of a main signal $h_{22}V_2$ 172 may be deteriorated in the terminal 170, and due to an interference signal $h_{13}V_1$ 181 and an interference signal $h_{23}V_2$ 182, a reception efficiency of a main signal $h_{33}V_3$ 183 may be deteriorated in the terminal 180.

In FIG. 1, each of the terminals 160, 170, and 180 may estimate a radio channel state with each of the base stations 110, 120, and 130, and may report the estimated radio channel states thereto. For example, the terminal 160 may estimate a state of the radio channel $h_{11}$ 131 with the base station 110, estimate a state of the radio channel $h_{21}$ 141 with the base station 120, and estimate a state of the radio channel $h_{31}$ 151 with the base station 130, and report the estimated radio channel states to each of the base stations 110, 120, and 130. Similarly, the terminal 170 may estimate radio channel states of radio channels $h_{12}$, $h_{22}$, and $h_{32}$ 132, 142, and 152, and report the estimated radio channel states to each of the base stations 110, 120, and 130, and the terminal 180 may estimate radio channel states of radio channels $h_{13}$, $h_{23}$, and $h_{33}$ 133, 143, and 153, and report the estimated radio channel states to each of the base stations 110, 120, and 130. Accordingly, each of the base stations 110, 120, and 130 may control a transmission signal based on all the states of the radio channels $h_{11}$, $h_{21}$, $h_{31}$, $h_{12}$, $h_{22}$, $h_{32}$, $h_{13}$, $h_{23}$, and $h_{33}$ 131, 141, 151, 132, 142, 152, 133, 143, and 153. For example, the transmission signal may be precoded so that a signal received by a terminal via a radio channel may have a particular phase.

As another example, each of the radio terminals 160, 170, and 180 may transmit estimated radio channel states to its corresponding main base station, and the main base station may transmit the radio channel states to an interference base station. For example, the terminal 160 may report the states of the radio channels $h_{11}$, $h_{21}$, and $h_{31}$ 131, 141, and 151 to the main base station, that is, the base station 110, and the base station 110 may transmit the reported states of the radio channels $h_{11}$, $h_{21}$, and $h_{31}$ 131, 141, and 151 to the base stations 120 and 130 corresponding to the interference base stations. The terminal 170 may report the states of the radio channels $h_{12}$, $h_{22}$, and $h_{32}$ 132, 142, and 152 to the main base station 120, and the main base station 120 may transmit the reported states of the radio channels $h_{12}$, $h_{22}$, and $h_{32}$ 132, 142, and 152 to the base stations 110 and 130 corresponding to the interference base stations. Similarly, the terminal 180 may report the states of the radio channels $h_{13}$, $h_{23}$, and $h_{33}$ 133, 143, and 153 to the main base station 130, and the main base station 130 may transmit the reported states of the radio channels $h_{13}$, $h_{23}$, and $h_{33}$ 133, 143, and 153 to the base stations 110 and 120 corresponding to the interference base stations. Accordingly, each of the base stations 110, 120, and 130 may have information associated with the states of all the radio channels $h_{11}$, $h_{21}$, $h_{31}$, $h_{12}$, $h_{22}$, $h_{32}$, $h_{13}$, $h_{23}$, and $h_{33}$ 131, 141, 151, 132, 142, 152, 133, 143, and 153, and may control the transmission signal based on the information.

According to an aspect, a network apparatus that is physically or logically separated from a base station may be used. The network apparatus may calculate and provide information that is used where a base station controls a transmission signal, based on a radio channel state. The information may be used, for example, when a transmission signal is precoded. The network apparatus may be wirelessly or by wire connected to each base station to receive a radio channel state and to transmit the information used where each corresponding base station controls the transmission signal.

A radio channel state reported by a terminal may include information associated with a level that a signal transmitted by a base station is distorted in a radio channel. A strength and a phase of a signal received by the terminal may change according to a channel gain and a channel phase of the radio channel. Accordingly, the radio channel state may include information associated with the channel gain or the channel phase.

Implementations described herein may use, for example, a frequency division multiple access (FDMA) scheme, a time division multiple access (TDMA) scheme, a code division multiple access (CDMA) scheme, a frequency division duplex (FDD) scheme, and a time division duplex (TDD) scheme to transmit and receive a signal.

In the case of the TDD scheme, it may be assumed that states of uplink channels formed between the base stations 110, 120, and 130, and the terminals 160, 170, and 180 are the same as states of downlink channels formed therebetween. Accordingly, each of the base stations 110, 120, and 130 may receive a pilot signal from each of the terminals 160, 170, and 180, and may estimate the uplink channel state. Since the uplink channel state is the same as the downlink channel state, uplink channel state information may be used as downlink channel state information.

Hereinafter, an example of using the FDD scheme will be described with reference to FIG. 1. In the case of the FDD scheme, states of uplink channels formed between the base stations 110, 120, and 130, and the terminals 160, 170, and 180 may be different from states of downlink channels formed between the base stations 110, 120, and 130, and the terminals 160, 170, and 180. Accordingly, each of the terminals 160, 170, and 180 may estimate the downlink channel states and transmit the estimated downlink channel states to each of the base stations 110, 120, and 130, and each of the base stations 110, 120, and 130 may control the transmission signal based on the downlink channel states 131, 141, 151, 132, 142, 152, 133, 143, and 153.

Referring to FIG. 1, an example of an interference alignment scheme where a transmission signal is controlled so that interference signals received by each terminal may have the same phase is described below. The terminal 160 may receive the interference signals $h_{21}V_2$ 162 and $h_{31}V_3$ 163 in addition to the main signal $h_{11}V_1$ 161. While the signal $V_2$ 124 transmitted from the base station 120 is received by the terminal 160 via the radio channel $h_{21}$ 141, a phase of the signal $V_2$ 124 may vary. For example, a phase of the interference signal $h_{21}V_2$ 162 may be different from the phase of the signal $V_2$ 124, and a phase of the interference signal $h_{31}V_3$ 163 may be different from the phase of the signal $V_3$ 134.

The base stations 120 and 130 may control the phase of the transmission signal $V_2$ 124 and the phase of the transmission signal $V_3$ 134, respectively, so that the interference signals $h_{21}V_2$ 162 and $h_{31}V_3$ 163 received by the terminal 160 may have the same phase. Similarly, the base stations 110 and 130 may control the phase of the transmission signal $V_1$ 114 and the phase of the transmission signal $V_3$ 134, respectively, so that the interference signals $h_{12}V_1$ 171 and $h_{32}V_3$ 173 received by the terminal 170 may have the same phase. Also, the base stations 110 and 120 may control the phase of the transmission signal $V_1$ 114 and the phase of the transmission signal $V_2$ 124, respectively, so that the interference signals $h_{13}V_1$ 181 and $h_{23}V_2$ 182 received by the terminal 180 may have the same phase. As described above, a phase of a transmission signal may be controlled by precoding the transmission signal.

In response to a plurality of interference signals received by each terminal having the same phase, it may be regarded that the corresponding terminal receives a single interference signal that is transmitted at relatively greater power. Also, although a number of interference signals increases, where the received interference signals have the same phase, it may be regarded that the terminal receives only a single interference signal. Referring to FIG. 1, for example, each of the terminals 160, 170, and 180 may consider two interference signals with the same phase as a single interference signal and thereby cancel the interference signals.

In the case of an interference neutralization scheme, prior to transmitting a transmission signal, interference base stations may control a phase of the transmission signal so that phases of interference signals received by a terminal may be opposite to each other. Like the interference alignment scheme, in the interference neutralization scheme, the terminal receiving the interference signals may regard the received interference signals as a single interference signal. For example, in response to phases of two interference signals being different from each other by 180 degrees, that is, are opposite to each other, a sum of the two interference signals may be regarded as a single interference signal with a relatively smaller magnitude.

An interference cancellation scheme may be used as the interference control scheme. In the case of the interference cancellation scheme, interference base stations may control a transmission signal, for example, by controlling a phase of the transmission signal and/or a magnitude of the transmission signal, so that interference signals may be cancelled. Phases of the interference signals received by the terminal may be diversified.

For example, where two interference signals exist and have the same phase and magnitude, the interference alignment scheme may be applied. As another example, where phases of the two interference signals are opposite to each other and the two interference signals have the same magnitude, the interference neutralization scheme may be applied.

An ITN scheme may be used as the interference control scheme. The ITN scheme may control a transmission signal so that a signal strength of interference signals received by a terminal decreases. For example, the ITN scheme may control a phase and a magnitude of the transmission signal so that a magnitude of a sum of the interference signals may be less than or equal to a predetermined reference value, or may be less than or equal to a predetermine ratio of a magnitude of a main signal. In this case, the terminal may treat the interference signals as noise.

<Transmission Power Control Scheme>

Figure 2:
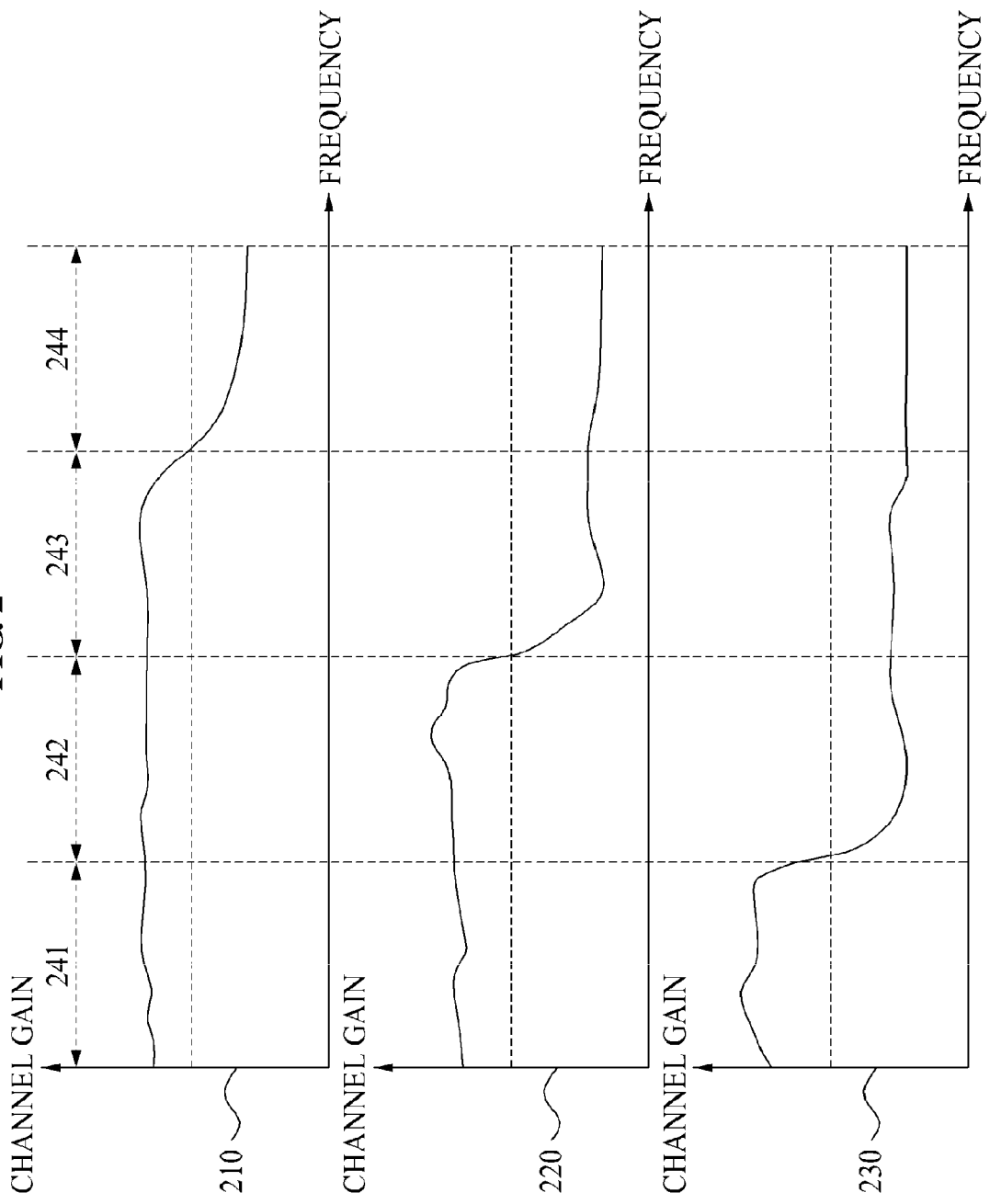
FIG. 2 is a graph illustrating an example of a change in a channel gain of a radio channel.

FIG. 2 illustrates an example of a change in a channel gain of a radio channel. Referring to FIGS. 1 and 2, a graph 210 illustrates a channel gain between of a radio channel between the base station 110 and the terminal 160, a graph 220 illustrates a channel gain of a radio channel between the base station 120 and the terminal 170, and a graph 230 illustrates a channel gain of a radio channel between the base station 130 and the terminal 180. Here, a vertical axis denotes a magnitude of the channel gain and a horizontal axis denotes a frequency.

Hereinafter, an exemplary transmission power control scheme will be described with reference to FIG. 2.

As shown in FIG. 2, the channel gain of the radio channel may vary according to the frequency. Where the channel gain of the radio channel has a large value, an error of a signal transmitted via the radio channel may decrease. Accordingly, a base station may transmit more signals to a terminal with a relatively large channel gain, and may transmit fewer signals to a terminal with a relatively small channel gain. Accordingly, it is possible to enhance a sum of data transmission rates.

Referring to FIG. 2, the channel gain of the radio channel may have a large value with respect to all the terminals in a frequency band 241. Accordingly, the base station may transmit a signal to each communication terminal at greater transmission power. In this case, the sum of transmission power with respect to each terminal may be controlled to not exceed a maximum transmission power of the base station that transmits the signal.

For example, referring to FIGS. 1 and 2, where the base stations 110, 120, and 130 transmit a signal to the corresponding terminals 160, 170, and 180, respectively, using the frequency band 241, each of the terminals 160, 170, and 180 may receive interference signals from its corresponding interference base stations. That is, the signal $V_1$ 114 transmitted from the base station 110 to the terminal 160 and the signal $V_2$ 124 transmitted from the base station 120 to the terminal 170 may function as the interference signals against the terminal 180. In order to enhance a signal reception performance of the terminal 180, the base station 130 may be controlled to transmit the signal $V_3$ 134 while the other base stations 110 and 120 may be controlled to not transmit a signal to the terminals 160 and 170 in the frequency 241.

The above may be similarly applicable to frequency bands 242, 243, and 244. For example, since a channel gain value of the radio channel, which increases with respect to the terminals 160 and 170, is high in the frequency band 242, the terminals 160 and 170 may use the frequency band 242 and the terminal 180 may not use the frequency band 242. In this case, since signals are transmitted to only two terminals 160 and 170, it may be possible to allocate relatively greater transmission power in comparison to a case where signals are transmitted to three terminals 160, 170, and 180. The signal $V_1$ 114 transmitted from the base station 110 to the terminal 160 may function as the interference signal against the terminal 170. In order to enhance a signal reception performance of the terminal 170, the base station 110 may be controlled to not transmit the signal $V_1$ 114 and the base station 120 may be controlled to transmit the signal $V_2$ 124 to the terminal 170. Since a channel gain value of the radio channel with respect to the terminal 160 is high in the frequency band 243, the terminal 160 may use the frequency band 243, and the remaining terminals 170 and 180 may not use the frequency band 243. In the frequency band 244, a channel gain value of the radio channel may be low with respect to all the terminals 160, 170, and 180. In this case, only a particular terminal may use the frequency band 244.

For ease of description, an example where only a single base station transmits a signal in a single frequency band has been described above, but it is understood that the transmission power control scheme is not limited thereto.

According to the aforementioned exemplary transmission power control scheme, it is possible to allocate transmission power to each terminal based on a radio channel state. A DSM scheme may be used for the transmission power control scheme. In this case, power for a base station to transmit a signal to a corresponding terminal may be dynamically determined so that a sum of data transmission rates may be maximized.

The exemplary transmission power control scheme has been described using an example where a channel gain varies according to a frequency, with reference to FIG. 2. However, it is understood that where the channel gain varies over time, a similar and corresponding transmission power control scheme may be used.

<Exemplary Implementation of Selectively Applying an Interference Control Scheme or a Transmission Power Control Scheme>

Figure 3:
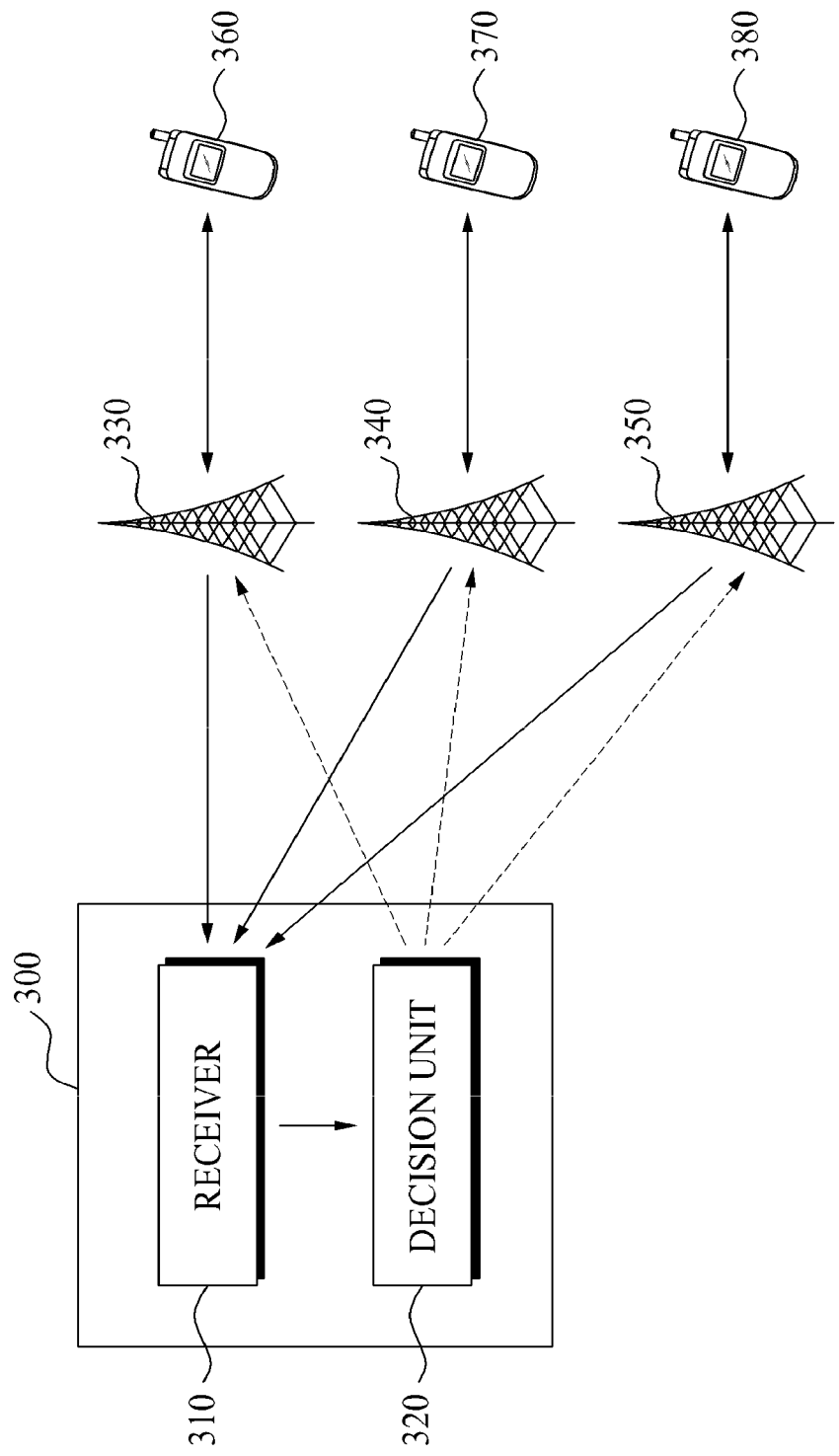
FIG. 3 is a block diagram illustrating a structure of an exemplary network apparatus.

FIG. 3 illustrates a structure of an exemplary network apparatus 300. The network apparatus 300 includes a receiver 310 and a decision unit 320. As an example, the network apparatus 300 may be a base station control unit that is physically or logically separated from a base station. As another example, the network apparatus 300 may be included in the base station as a single configuration module. The base station control unit may control the base station and determine a time slot where the base station transmits a signal, a frequency band, or transmission power of a transmission signal.

Referring to FIG. 3, terminals 360, 370, and 380 may be included in a service coverage of base stations 330, 340, and 350, respectively. Accordingly, each of the base stations 330, 340, and 350 may transmit a signal to each of the terminals 360, 370, and 380, respectively. Here, it is assumed that the base stations 330, 340, and 350, and the terminals 360, 370, and 380 of FIG. 3 correspond to the base stations 110, 120, and 130, and the terminals 160, 170, and 180 of FIG. 1.

The receiver 310 may receive radio channel state information between each of the base stations 330, 340, and 350, and each of the terminals 360, 370, and 380. For example, in the case of the base station 330, radio channel state information between the base station 330 and the terminal 360 may be signal quality information of the terminal 360. The receiver 310 may receive signal quality information associated with each of the terminals 360, 370, and 380 that are included in the service coverage of the base stations 330, 340, and 350, respectively. The signal quality information may be a signal-to-noise power ratio (SNR) or an interference-to-noise power ratio (INR) of the radio channel between each of the base stations 330, 340, and 350, and each of the terminals 360, 370, and 380. The SNR may denote a ratio of power of a main signal to power of noise, and the INR may denote a ratio of power of an interference signal to power of noise. Where the base station 330 is a main base station of the terminal 360, the SNR may denote a ratio of the power of a main signal h11V1 161 to power of thermal noise, and the INR may denote a ratio of a sum of power of interference signals h21V2 162 and h31V3 163 to power of thermal noise.

The signal quality information may be calculated based on a gain of a signal channel formed between a main base station and a terminal, or a gain of an interference channel formed between an interference base station and a terminal. Also, the signal quality information may be calculated based on signal transmission power or interference transmission power of each base station, and may also be calculated based on a noise power of a terminal.

The signal quality information may consider a received signal between a base station and a designated terminal, and an interference signal with the terminal. The signal quality information of the terminal 360 may be generated by considering all the radio channel state information between the terminal 360 and the base stations 330, 340, and 350. The signal quality information of the terminal 370 may be generated by considering all the radio channel state information between the terminal 370 and the base stations 330, 340, and 350. The signal quality information of the terminal 380 may be generated by considering all the radio channel state information between the terminal 380 and the base stations 330, 340, and 350.

The decision unit 320 may determine whether to apply an interference control scheme to a signal to be transmitted to each of the terminals 360, 370, and 380, based on the received signal quality information. As described above, the interference control scheme may be, for example, one of an interference alignment scheme, an interference neutralization scheme, an interference cancellation scheme, and an ITN scheme.

The decision unit 320 may compare signal quality information associated with each radio channel with a predetermined reference value to determine whether to apply the interference control scheme. Where the signal quality information is greater than or equal to the reference value, the decision unit 320 may determine to apply the interference control scheme to the terminals 360, 370, and 380. For example, the decision unit 320 may determine to apply the interference control scheme to a terminal of which each of the SNR and the INR is greater than the reference value, among the terminals 360, 370, and 380.

Where the decision unit 320 determines to apply the interference control scheme, for example, the interference alignment scheme to each of the terminals 360, 370, and 380, the decision unit 320 may determine a terminal that constitutes a pair to receive a signal with respect to each of the base stations 330, 340, and 350. Referring to FIG. 3, the decision unit 320 may determine, as a transmission-reception pair including a base station and a terminal, the base station 330 and the terminal 360, the base station 340 and the terminal 370, and the base station 350 and the terminal 380. In this case, each of the terminals 360, 370, and 380 may receive, from its corresponding interference base stations, interference signals of which phases are controlled to be the same as each other.

Where the interference alignment scheme is applied, it may be possible to additionally apply a scheme to control a phase of an interference signal received by each of the terminals 360, 370, and 380 to be orthogonal to a phase of a main signal. In the case of the terminal 360, phases of interference signals $h_{21}V_2$ 162 and $h_{31}V_3$ 163 may be controlled to be the same as each other and to be orthogonal to a phase of a main signal $h_{11}V_1$ 161. Where the main signal and the interference signal are orthogonal to each other, the terminal 360 may more effectively cancel the interference signal using the above orthogonality.

The decision unit 320 may determine to not apply the interference control scheme to a signal to be transmitted to each of the terminals 360, 370, and 380. In this case, each of the base stations 330, 340, and 350 may apply the transmission power control scheme, for example, the DSM scheme, to a signal to be transmitted to each of the terminals 360, 370, and 380. The transmission power control scheme is described above in detail with reference to FIG. 2 and thus further detailed description related thereto will be omitted here for conciseness.

The decision unit 320 may generate a control signal depending on whether to apply the interference control scheme or the transmission power control scheme, and may transmit the control signal to each of the base stations 330, 340, and 350. Each of the base stations 330, 340, and 350 may transmit a transmission signal to each of the terminals 360, 370, and 380 using the interference control scheme or the transmission power control scheme according to the control signal.

Figure 4:
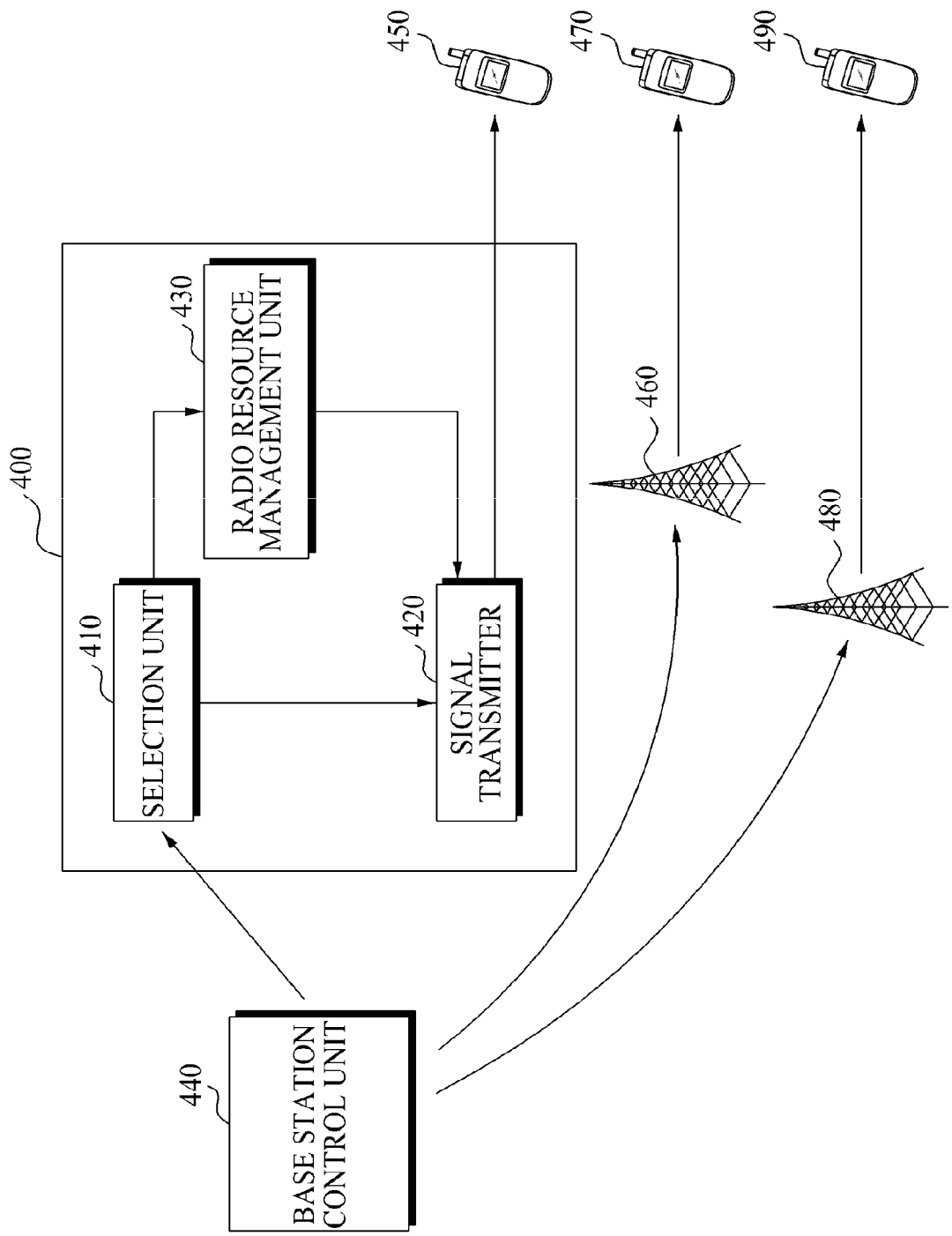
FIG. 4 is a block diagram illustrating a structure of another exemplary network apparatus.

FIG. 4 illustrates a structure of another exemplary network apparatus 400. The network apparatus 400 may be, for example, a base station. The network apparatus 400 may apply an interference control scheme or a transmission power control scheme to a signal to be transmitted to terminals 450, 470, and 490 according to a control of a base station control unit 440. The network apparatus 400 includes a selection unit 410, a signal transmitter 420, and a radio resource management unit 430.

The selection unit 410 may select, between the interference control scheme and the transmission power control scheme, a scheme to be applied to the terminals 450, 470, and 490 that are included in a service coverage of base stations 400, 460 and 480. The selection unit 410 may receive a control signal from the base station control unit 440, and select which scheme to apply to a transmission signal according to the received control signal.

The radio resource management unit 430 may manage radio resources that are pre-allocated to apply the interference control scheme. Also, the radio resource management unit 430 may manage radio resources that are pre-allocated to apply the transmission power control scheme.

The selection unit 410 may select a scheme to be applied to a transmission signal, using the radio resource management unit 430. As described above, radio resources allocated to a particular base station may be divided into radio resources to apply the interference control scheme and radio resources to apply the transmission power control scheme, using the radio resource management unit 430. The selection unit 410 may selectively apply the interference control scheme or the transmission power control scheme to the divided radio resources.

Depending on the above selection result, the signal transmitter 420 may apply any one of the interference control scheme and the transmission power control scheme to the radio resources to thereby transmit a signal to the terminals 450, 470, and 490.

As an example, the interference control scheme may be initially considered with respect to radio resources of each base station. The transmission power control scheme may be applied to the remaining radio resources. As another example, radio resources to apply the transmission power control scheme may be determined. The interference control scheme may be applied to radio resources where the transmission power control scheme is not applied.

Figure 5:
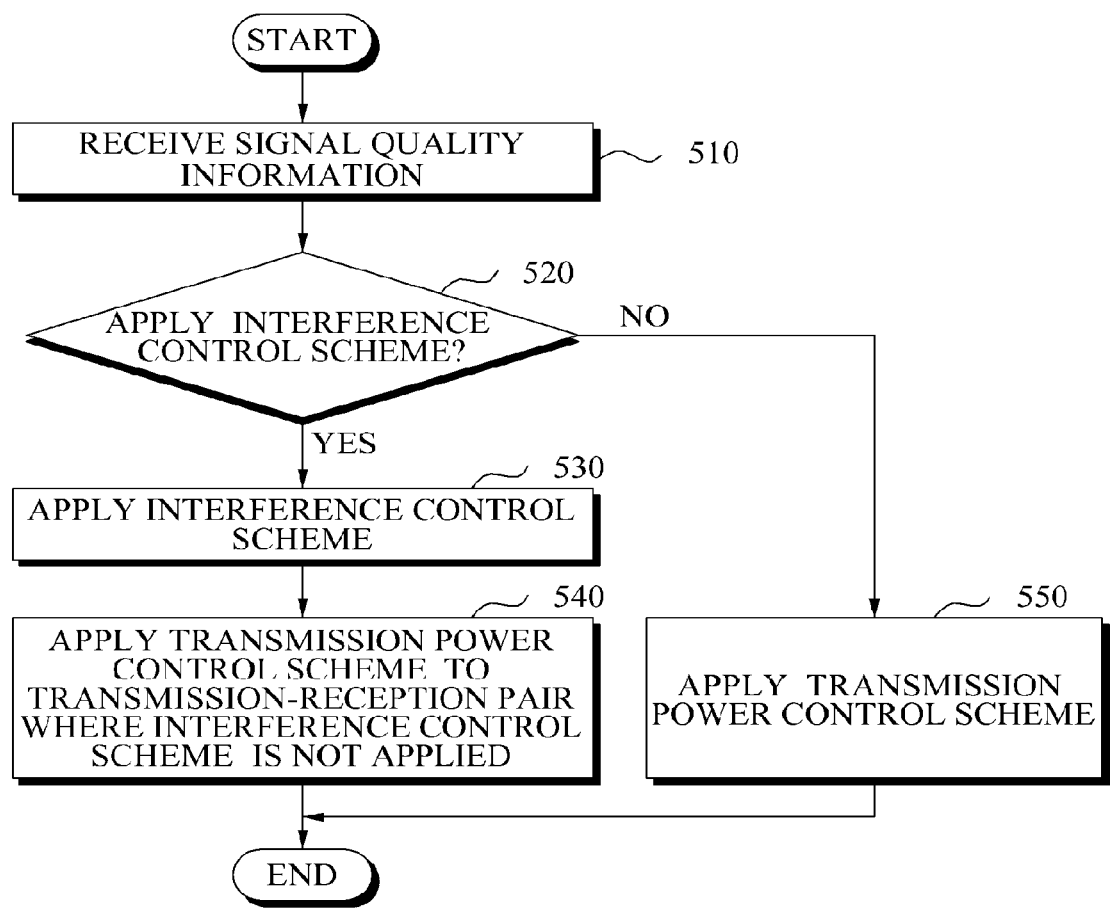
FIG. 5 is a flowchart illustrating an exemplary method of selectively applying either an interference control scheme or a transmission power control scheme.

FIG. 5 shows a flowchart illustrating an exemplary method of selectively applying either an interference control scheme or a transmission power control scheme. The method may be performed by an apparatus disclosed above.

In operation 510, a network apparatus receives signal quality information. The signal quality information may be an SNR or an INR of a radio channel formed between a particular base station and a particular terminal that are included in a transmission-reception pair. The signal quality information may be calculated based on a gain of a radio channel formed between a terminal and a main base station. Also, the signal quality information may be calculated based on a gain of an interference channel formed between the terminal and an interference base station. The signal quality information may also be calculated based on noise power of the terminal.

In operation 520, the network apparatus determines whether to apply an interference control scheme to a particular radio resource based on the signal quality information. The interference control scheme may be one of an interference alignment scheme, an interference neutralization scheme, an interference cancellation scheme, and an ITN scheme. The network apparatus may compare the signal quality information with a reference value to determine whether to apply the interference control scheme to a particular transmission-reception pair. In response to the signal quality information associated with the particular transmission-reception pair being greater than or equal to the reference value, the network apparatus may determine to apply the interference control scheme to the particular transmission-reception pair. For example, the network apparatus may determine to apply the interference control scheme, for example, the interference alignment scheme to a terminal of which the SNR is greater than a first reference value and the INR is greater than a second reference value. Where at least three transmission-reception pairs include signal quality information greater than the reference value, the network apparatus may determine to apply the interference control scheme, for example, the interference alignment scheme. Since the signal quality information may vary over time, operation 520 may be performed according to a predetermined scheduling period.

In response to determining to apply the interference control scheme in operation 520, the network apparatus applies the interference control scheme to the corresponding transmission-reception pair in operation 530. The network apparatus may apply, for example, the interference alignment scheme.

The network apparatus may receive signal quality information associated with a transmission-reception pair where the interference control scheme is not applied. For example, the signal quality information associated with base station-terminal pair where the interference control scheme is not applied may be a signal-to-interference and noise power ratio (SINR).

In operation 540, the network apparatus applies the transmission power control scheme to the transmission-reception pair where the interference control scheme is not applied, based on signal quality information associated therewith. The network apparatus may use, for example, the DSM scheme.

Where there is no transmission-reception pair in which the interference control scheme is applied, in operation 520, the network apparatus applies the transmission power control scheme, for example, the DSM scheme, to all the transmission-reception pairs in operation 550.

Figure 6:
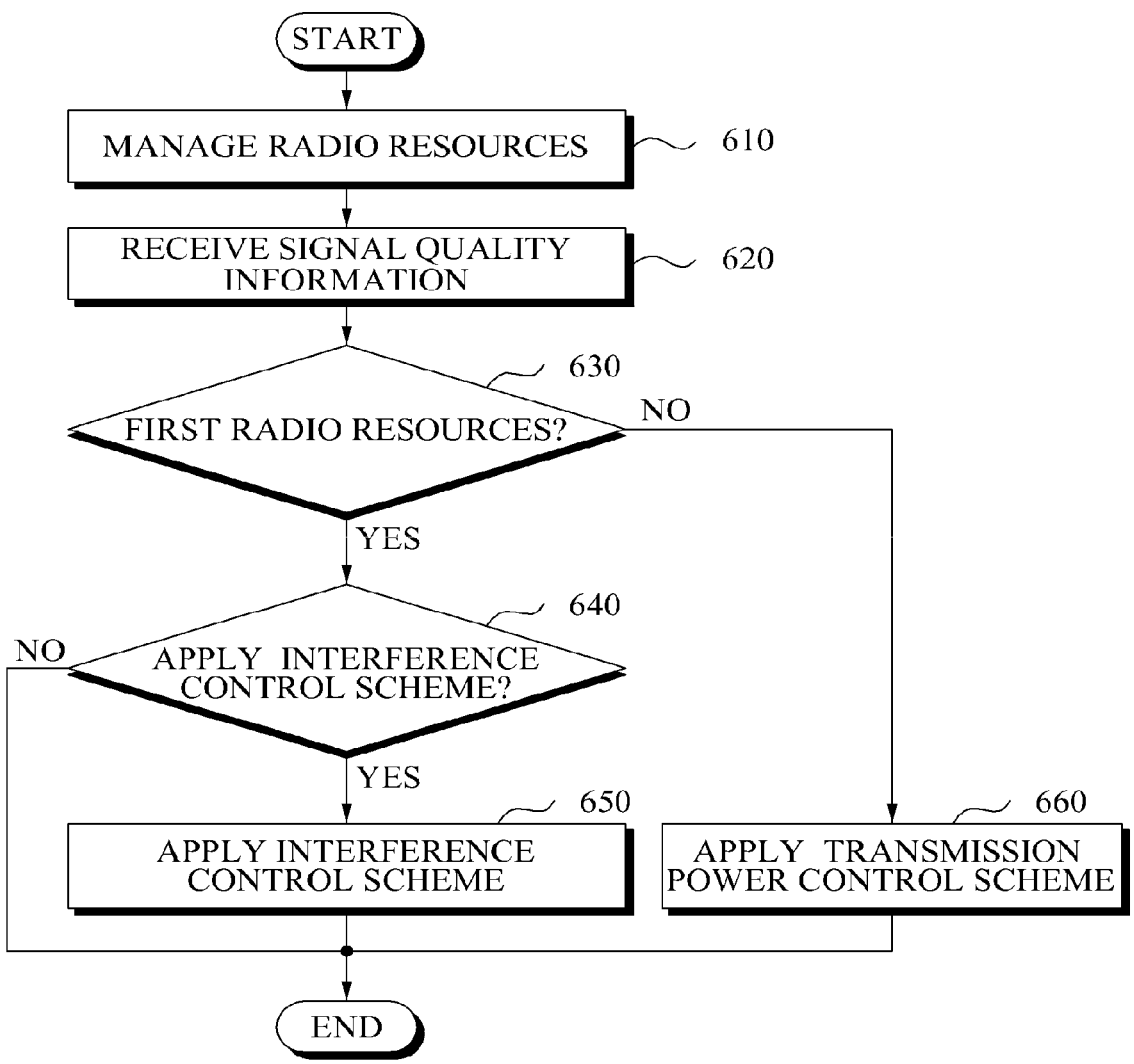
FIG. 6 is a flowchart illustrating another exemplary method of selectively applying either an interference control scheme or a transmission power control scheme.

FIG. 6 shows a flowchart illustrating another exemplary method of selectively applying either an interference control scheme or a transmission power control scheme. The method may be performed by an apparatus disclosed above.

In operation 610, a network apparatus divides radio resources, allocated to a base station, into first radio resources to be applied with the interference control scheme and second radio resources to be applied with the transmission power control scheme. The network apparatus may divide the radio resources based on a quality of service (QoS) associated with a service used by a terminal, a number of terminals where the interference control scheme and the transmission power control scheme are applied, and the like.

In operation 620, the network apparatus receives signal quality information that is generated by the terminal. The signal quality information may be an SNR. Each base station may transmit a pilot signal to each terminal. Each terminal may calculate the SNR based on the received pilot signal.

In operation 630, the network apparatus determines whether particular radio resources allocated to each transmission-reception pair are first radio resources. The network apparatus may determine whether the interference control scheme may be applicable to the particular radio resources, based on management information associated with the first radio resources and second radio resources.

In response to determining that the particular resources are not the first radio resources in operation 630, each base station transmits a transmission signal to the terminal using the transmission power control scheme in operation 660. Each base station may dynamically determine power of the transmission signal so that a sum of data transmission rates of the base station may be maximized, based on a state of a radio channel formed between the base station and the terminal.

In response to determining that the particular resources are the first radio resources in operation 630, the network apparatus determines whether to apply the interference control scheme to the particular radio resources in operation 640. The network apparatus may determine whether to apply the interference control scheme based on a performance of a communication system where the interference control scheme is applied to the particular radio resources, a system load to apply the interference control scheme, and the like.

Where it is determined to apply the interference control scheme in operation 640, the network apparatus applies the interference control scheme to the particular radio resources in operation 650.

Figure 7:
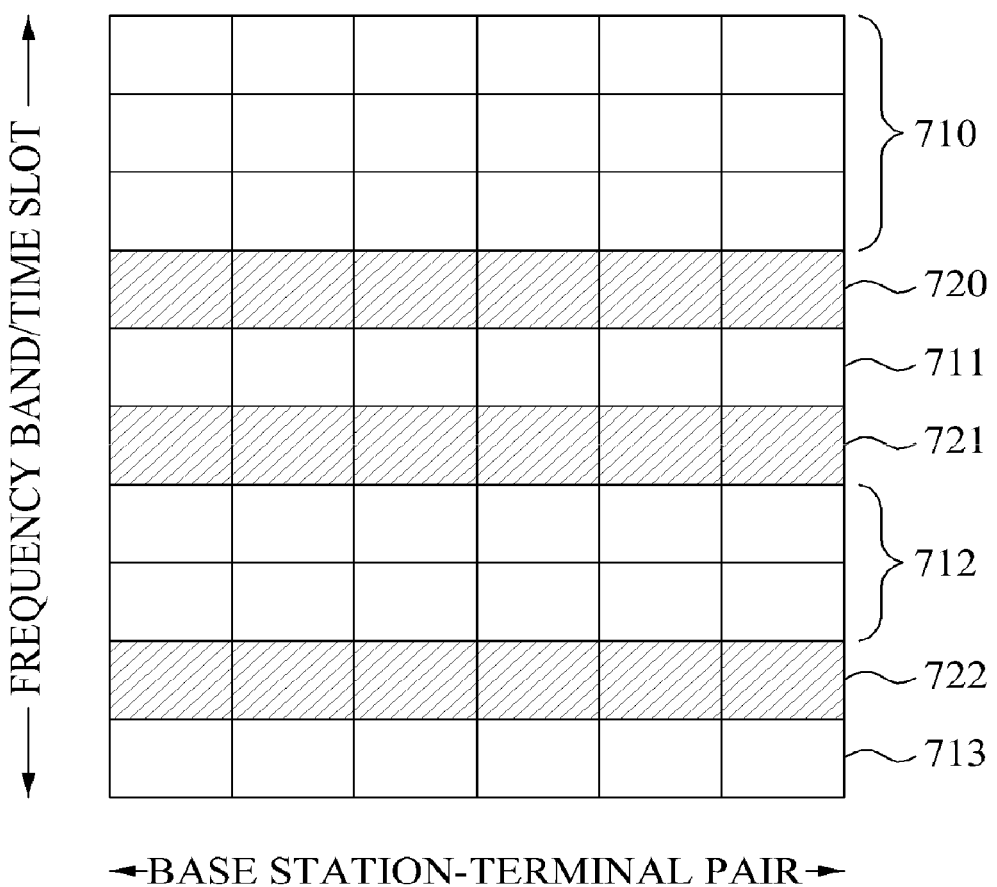
FIG. 7 is a diagram illustrating an example of radio resources where either an interference control scheme or a transmission power control scheme is selectively applied according to an exemplary implementation.

FIG. 7 illustrates an example of radio resources where either an interference control scheme or a transmission power control scheme is selectively applied according to an exemplary implementation. Here, a vertical axis denotes a frequency band or a time slot corresponding to radio resources. A horizontal axis denotes a transmission-reception pair, including a base station and a terminal, to transmit and receive data using the radio resources. Shaded portions denote radio resources 720, 721, and 722 to be applied with the interference control scheme. Non-shaded portions denote radio resources 710, 711, 712, and 713 to be applied with the transmission power control scheme. As shown in FIG. 7, frequency bands may be selectively divided into the radio resources 720, 721, and 722 to be applied with the interference control scheme and the radio resources 710, 711, 712, and 713 to be applied with the transmission power control scheme.

Although the interference control scheme or the transmission power control scheme is selectively applied to all the transmission-reception pairs in FIG. 7, the above scheme may be applied to only a portion of transmission-reception pairs.

The aforementioned scheme of selectively applying the interference control scheme or the transmission power control scheme may be performed through the network apparatus 300 or 400 shown in FIG. 3 or 4.

<Implementation of Applying Both an Interference Control Scheme and a Transmission Power Control Scheme>

Where only the interference control scheme is used, an interference signal may not be completely cancelled. The effect of interference signals remaining even after applying the interference control scheme may be referred to as residual interference. The amount of the residual interference may be calculated, estimated, or determined using various types of schemes. For example, a network apparatus may compare equivalent signal quality information with a reference value to determine the amount of residual interference.

The amount of residual interference may be used to determine whether to apply both the interference control scheme and the transmission power control scheme, or whether to selectively apply the interference control scheme or the transmission power control scheme.

For example, where a magnitude of an SNR and a magnitude of an INR are similar to each other or within a predetermined ratio, and the amount of residual interference is less than the reference value, it may be determined to apply only the interference control scheme and to not apply the transmission power control scheme.

As another example, where the magnitude of the SNR and the magnitude of the INR are similar to each other or within the predetermined ratio, and the amount of residual interference is greater than the reference value, it may be determined to apply both the interference control scheme and the transmission power control scheme. In one implementation, an interference alignment scheme may be used as the interference control scheme.

As another example, where the SNR is less than the INR and the amount of residual interference is less than the reference value, it may be determined to apply only the interference control scheme and to not apply the transmission power control scheme. In one implementation, an interference cancellation scheme may be used as the interference control scheme.

As another example, where the SNR is less than the INR and the amount of residual interference is greater than the reference value, it may be determined to apply both the interference control scheme and the transmission power control scheme. In one implementation, the interference cancellation scheme may be used as the interference control scheme.

As another example, where the SNR is greater than the INR, it may be determined to apply an ITN scheme as the interference control scheme.

Whether to apply the transmission power control scheme may be determined depending on whether a signal transmission system may bear the computing load, required to process the transmission power control scheme, or the complexity.

Hereinafter, an implementation of applying both the interference control scheme and the transmission power control scheme will be described.

Where the interference control scheme is applied, equivalent signal quality information may be calculated and radio resources may be allocated based on the equivalent signal quality information. Accordingly, the interference control scheme and the transmission power control scheme may be coupled with each other. With both the interference control scheme and the transmission power control scheme being applied, the effect of interference signals not reduced by the interference control scheme may be further reduced by the transmission power control scheme. Accordingly, a signal reception performance of a terminal may be enhanced.

Where the interference alignment scheme is used as the interference control scheme, the effect of interference signals may decrease. In order to additionally apply the transmission power control scheme, an SINR may be calculated based on the decrease in the effect of interference signals. The SINR may be defined based on a ratio of reception power of a main signal to a sum of power of thermal noise and reception power of the interference signal. The SINR that is recalculated based on the decreased effect of the interference signals may be referred to as an equivalent SINR. A data transmission rate may be calculated again based on the equivalent SINR. In order to apply the transmission power control scheme, a transmission power may be determined so that a sum of data transmission rates with respect to each terminal may be maximized.

Where the interference alignment scheme is used as the interference control scheme, an equivalent SINR of a $k^{th}$ terminal may be calculated according to the following Equation 1:

$$\frac{a_{kk}^n \cdot p_k^n}{\sum_{j \in K, j \neq k} a_{jk}^n \cdot p_j^n + \sigma_k^n}. \tag{1}$$

Here, n denotes a signal transmission using an $n^{th}$ frequency band among a plurality of frequency bands that are allocated to a main base station. j denotes a variable associated with a $j^{th}$ base station, and k denotes a variable associated with a $k^{th}$ terminal. $P_k^n$ denotes a transmission power of a main signal that is transmitted from a $k^{th}$ base station to a terminal using the $n^{th}$ frequency band. $P_j^n$ denotes transmission power of an interference signal that is transmitted from a $j^{th}$ interference base station to the terminal using the $n^{th}$ frequency band. $\sigma_k^n$ denotes thermal noise in the $n^{th}$ frequency band of the $k^{th}$ terminal. $\alpha_{jk}^n$ denotes an equivalent channel gain that reflects a relationship in the $n^{th}$ frequency band between a phase of the interference signal, transmitted from the $j^{th}$ base station to the $k^{th}$ terminal, and a phase of the main signal transmitted from the main base station to the $k^{th}$ terminal. $\alpha_{kk}^n$ denotes an equivalent channel gain in the $n^{th}$ frequency band between the $k^{th}$ base station and the $k^{th}$ terminal where the interference alignment scheme is applied.

Referring to the above Equation 1, the data transmission rate of the $k^{th}$ terminal receiving data using the interference alignment scheme may be calculated according to the following Equation 2:

$$\log\left(1 + \frac{a_{kk}^n \cdot p_k^n}{\sum_{j \in K, j \neq k} a_{jk}^n \cdot p_j^n + \sigma_k^n}\right). \tag{2}$$

Referring to the above Equation 2, the transmission power of each terminal may be determined so that a sum of data transmission rates of each base station may be maximized based on maximum transmission power of each base station. Where a main signal is transmitted by applying the interference alignment scheme with respect to a portion of all the terminals included in the signal transmission system, the transmission power maximizing the data transmission rate may satisfy the following Equation 3:

$$\max \cdot \sum_{k \in K} \left[ \sum_{n \in N \cap N_{IA}^C} \log\left(1 + \frac{h_{kk}^n \cdot p_k^n}{\sum_{j \in K, j \neq k} h_{jk}^n \cdot p_j^n + \sigma_k^n}\right) + \sum_{n \in N \cap N_{IA}} \log\left(1 + \frac{a_{kk}^n \cdot p_k^n}{\sum_{j \in K, j \neq k} a_{jk}^n \cdot p_j^n + \sigma_k^n}\right) \right]. \tag{3}$$

Here, K denotes a set of all the base stations included in the signal transmission system, and N denotes a set of all the sub-frequencies that may be used by the signal transmission system. $N_{IA}$ denotes a set of sub-frequencies where the interference alignment scheme may be applied. $N_{IA}{}^C$ denotes a set of sub-frequencies where the interference alignment scheme may not be applied. $h_{jk}{}^n$ denotes a channel state of a radio channel from the $j^{th}$ base station to the $k^{th}$ terminal. $h_{kk}{}^n$ denotes a channel state of a radio channel from the $k^{th}$ base station to the $k^{th}$ terminal in the $n^{th}$ frequency band. For example, in the above Equation 3, a first component of a square bracket denotes a sum of data transmission rates of terminals that do not receive a signal according to the interference alignment scheme. A second component of the square bracket denotes a sum of data transmission rates of terminals that receive a signal according to the interference alignment scheme.

Accordingly, where the interference alignment scheme is not applied, the transmission power $P_k{}^n$ and $P_j{}^n$ maximizing the data transmission rate may be calculated based on only the first component of the above Equation 3.

Also, where all the terminals receive a signal using the interference alignment scheme, the transmission power $p_k{}^n$ and $p_j{}^n$ maximizing the data transmission rate may be calculated based on only the second component of the above Equation 3.

Where both the first component and the second component are considered, it is possible to calculate the maximum transmission power where both the interference control scheme and the transmission power control scheme are applied. For example, even where the interference control scheme is applied to a portion of terminals, the maximum transmission power may be calculated to maximize the data transmission rate with respect to both the terminals where the interference control scheme is applied and the terminals where the interference control scheme is not applied.

Although the above Equation 3 represents a case where a single base station transmits data to only a single terminal in a particular time slot, the above Equation 3 may be expanded to a case where the single base station divides radio resources based on both the frequency axis and the time axis, and transmits data to at least one terminal in the particular time slot.

Considering that each base station may not transmit a signal using infinite transmission power, the transmission power may further satisfy the following Equation 4 and Equation 5:

$$\sum_n p_k^n \le P_k, \quad (4)$$

where $P_k{}^n$ denotes the transmission power of the main signal that is transmitted from the $k^{th}$ base station to the terminal using the $n^{th}$ frequency band, and $P_k$ denotes the maximum transmission power of the $k^{th}$ base station, and $$0 \le P_k^n \le P_{k,MAX}^n \quad (5),$$

where $P_{k,MAX}{}^n$ denotes the maximum transmission power of the $k^{th}$ base station in the $n^{th}$ frequency band.

To apply the aforementioned exemplary implementation, a base station may divide available radio resources depending on whether to apply the interference control scheme and/or the transmission power control scheme. For example, in order to enhance the use of frequency resources, the base station may divide the entire frequency resources into a plurality of sub-frequency resources. As an illustration, first sub-frequency resources may denote frequency resources where only the interference control scheme is applied and the transmission power control scheme is not applied. Second sub-frequency resources may denote frequency resources where the transmission power control scheme is applied and the interference control scheme is not applied. Third sub-frequency resources may denote frequency resources where both the interference control scheme and the transmission power control scheme are applied. The base station may transmit data using a plurality of sub-frequency resources, which is similar to an FDD scheme.

Similarly, the base station may divide time resources into a plurality of time slots depending on whether to apply the interference control scheme and/or the transmission power control scheme. The base station may transmit a transmission signal to a terminal using the plurality of time slots, which is similar to a TDD scheme.

Figure 8:
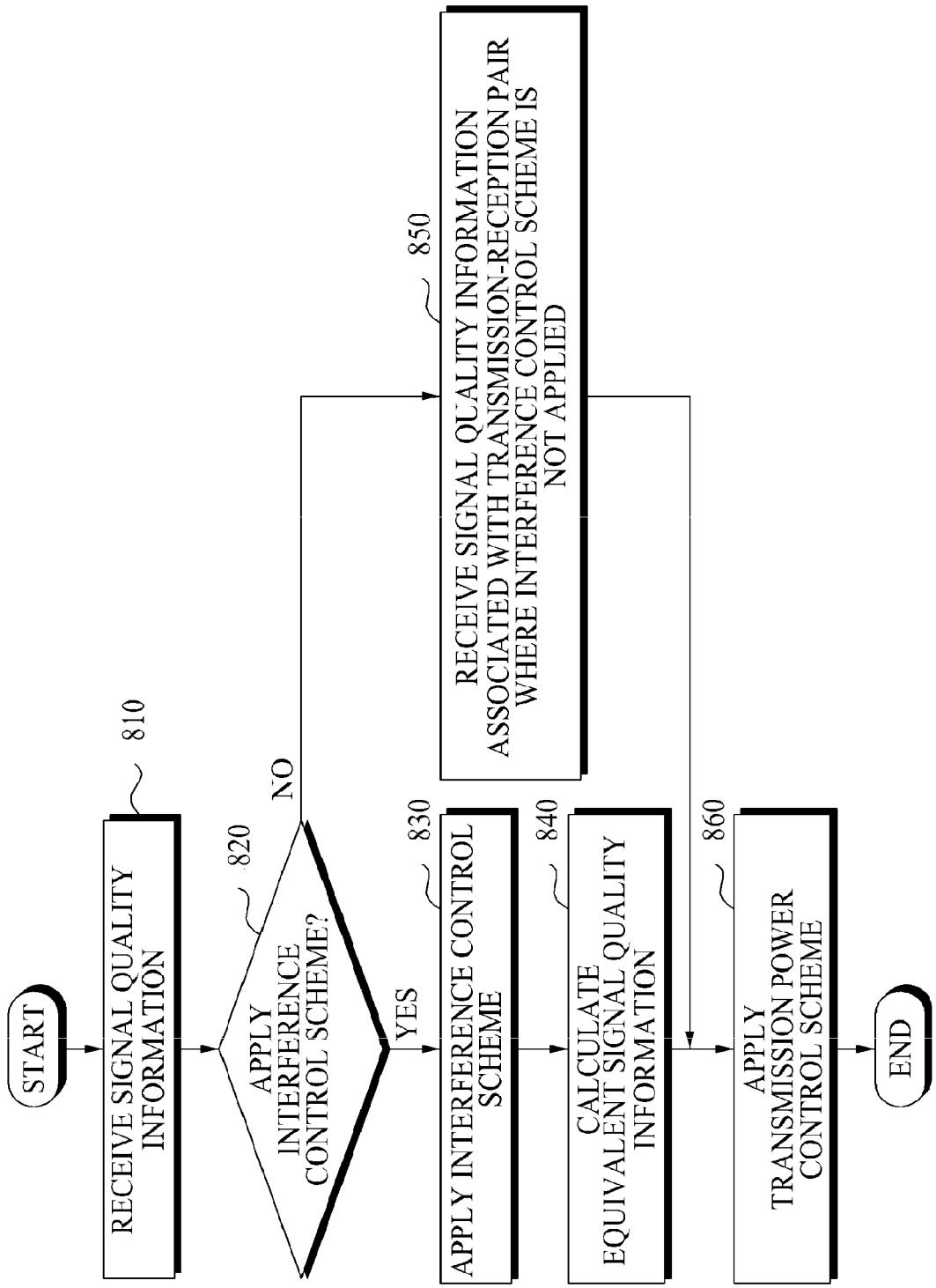
FIG. 8 is a flowchart illustrating an exemplary method of applying both an interference control scheme and a transmission power control scheme using equivalent signal quality information.

FIG. 8 shows a flowchart illustrating an exemplary method of applying both an interference control scheme and a transmission power control scheme using equivalent signal quality information. The method may be performed by an apparatus disclosed above.

In operation 810, a network apparatus receives signal quality information. The signal quality information may be an SNR with respect to each transmission-reception pair including a base station and a terminal.

In operation 820, the network apparatus determines whether to apply the interference control scheme to radio resources allocated to a base station. The network apparatus may make the decision based on the signal quality information, and may select a transmission-reception pair, including a base station and a terminal, to which the interference control scheme based on the decision is applied.

In operation 830, the network apparatus applies the interference control scheme to the selected transmission-reception pair.

In operation 840, the network apparatus calculates the equivalent signal quality information associated with the transmission-reception pair where the interference control scheme is applied. Where the interference control scheme is applied to a particular transmission-reception pair, the effect of interference signals against radio resources used by the particular transmission-reception pair may decrease. Considering this, the network apparatus may calculate the equivalent signal quality information. The calculated equivalent signal quality information may be an SINR with respect to the particular transmission-reception pair where the interference control scheme is applied.

In operation 850, the network apparatus receives signal quality information associated with a transmission-reception pair where the interference control scheme is not applied. The received signal quality information may be an SINR with respect to the transmission-reception pair where the interference control scheme is not applied.

In operation 860, the network apparatus applies the transmission power control scheme, for example, a DSM scheme. The network apparatus may apply the transmission power control scheme using the equivalent signal quality information that is calculated with respect to the radio resources where the interference control scheme is applied in operation 840. Also, the network apparatus may apply the transmission power control scheme using the signal quality information that is calculated with respect to the radio resources where the interference control scheme is not applied in operation 850. For example, the transmission power control scheme may be additionally applied to the radio resources where the interference control scheme is applied. In operation 860, the network apparatus may determine transmission power that maximizes a sum of data transmission rates.

Figure 9:
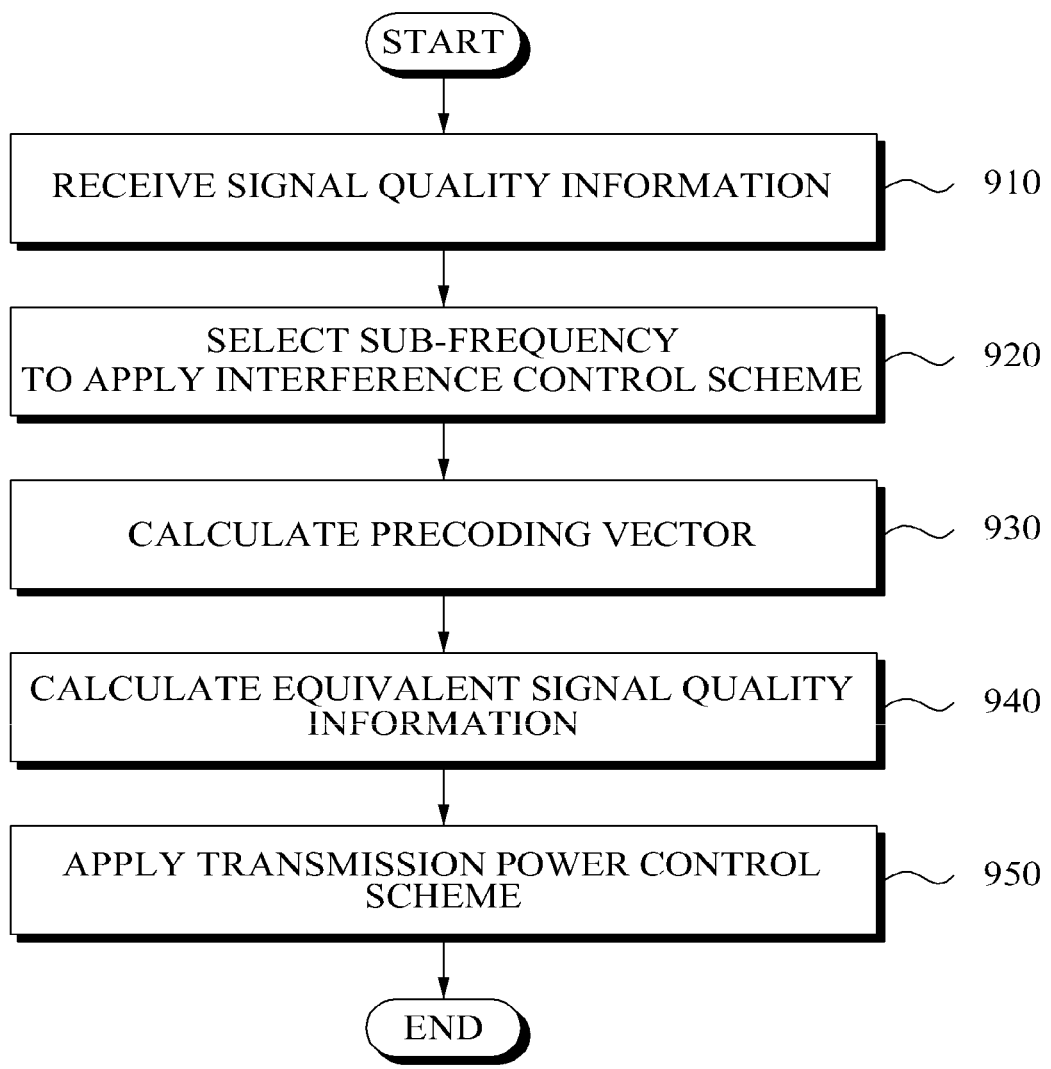
FIG. 9 is a flowchart illustrating an exemplary method of applying both an interference control scheme and a transmission power control scheme to a plurality of sub-frequency bands.

FIG. 9 shows a flowchart illustrating an exemplary method of applying both an interference control scheme and a transmission power control scheme to a plurality of sub-frequency bands. The method may be performed by an apparatus disclosed above.

In operation 910, a network apparatus receives signal quality information. The signal quality information may be an SNR with respect to each transmission-reception pair including a base station and a terminal.

In operation 920, the network apparatus selects sub-frequency bands from the plurality of sub-frequency bands, to apply the interference control scheme based on the signal quality information. As described above with reference to FIG. 2, a channel gain of a radio channel may vary over time and according to a frequency. Accordingly, although the interference control scheme is applied to particular sub-frequency bands, the effect of the interference signals may not decrease as desired. However, where the interference control scheme is applied to other sub-frequency bands, the effect of the interference signals may decrease significantly.

In operation 930, the network apparatus calculates a precoding vector. The network apparatus may control a phase of a signal using the precoding vector. The base station included in the transmission-reception pair may transmit, to the terminal, a signal of which a phase is controlled, using the precoding vector. The signal transmitted from the base station may function as an interference signal against another terminal that is not included in the transmission-reception pair. The base station may precode a transmission signal so that the signal received by the terminal via a radio channel may have a particular phase. The base station may apply, for example, one of an interference alignment scheme, an interference cancellation scheme, and an interference neutralization scheme, using the precoding vector.

In operation 940, the network apparatus calculates an equivalent channel gain. Where the interference control scheme is applied to the transmission-reception pair, a value of the channel gain may vary. In operation 940, the network apparatus may calculate the varied value of the channel gain as the equivalent channel gain by considering the interference control scheme. In operation 940, the network apparatus may calculate the equivalent signal quality information based on the value of the equivalent channel gain.

In operation 950, the network apparatus may determine transmission power. The network apparatus may reflect the equivalent channel gain or the equivalent signal quality information in the radio resources where the interference control scheme is applied, so as to additionally apply the transmission power control scheme.

Figure 10:
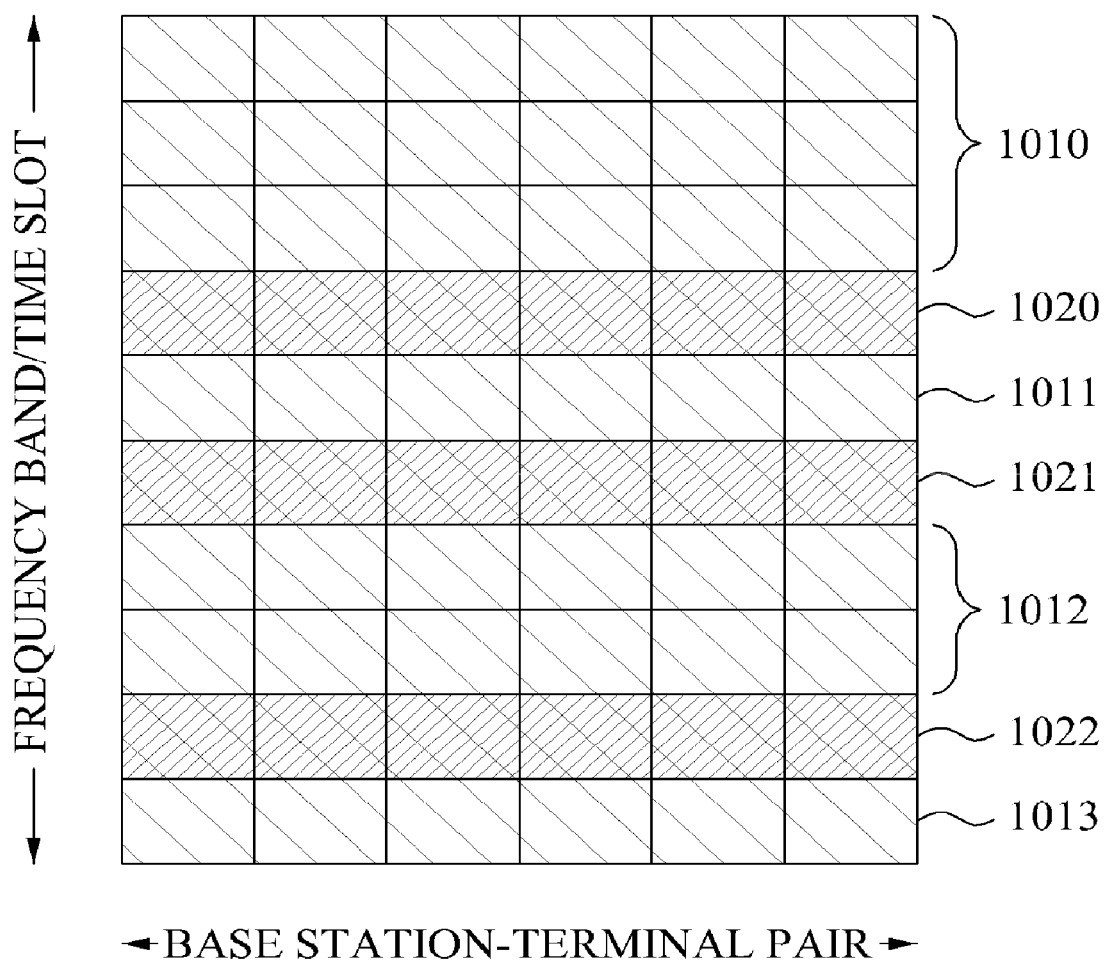
FIG. 10 is a diagram illustrating an example of radio resources where both an interference control scheme and a transmission power control scheme are applied according to an exemplary implementation.

FIG. 10 illustrates an example of radio resources where both an interference control scheme and a transmission power control scheme are applied according to an exemplary implementation. A vertical axis denotes a frequency band or a time slot corresponding to radio resources, and a horizontal axis denotes a transmission-reception pair, including a base station and a terminal, to transmit and receive data using the radio resources.

Portions shaded from a left top to a right bottom denote radio resources 1010, 1011, 1012, 1013, 1020, 1021, and 1022 where the transmission power control scheme is applied. Among the above shaded portions, portions also shaded from a right top to a left bottom denote the radio resources 1020, 1021, and 1022 where the interference control scheme is applied. As shown in FIG. 10, radio resources allocated to a signal transmission system may be divided into the radio resources 1020, 1021, and 1022 where both the interference control scheme and the transmission power control scheme are applied, and the radio resources 1010, 1011, 1012, and 1013 where only the transmission power control scheme is applied. Although FIG. 10 illustrates an example where both the interference control scheme and the transmission power control scheme are applied to all the transmission-reception pairs, the above schemes may be applicable to only a portion of the transmission-reception pairs. For example, the interference control scheme or the transmission power control scheme may be selectively applied to only a portion of the terminals. Both the interference control scheme and the transmission power control scheme may be applied to another portion of the terminals.

A scheme of applying both the interference control scheme and the transmission power control scheme may be performed by the network apparatus 300 or 400 of FIG. 3 or 4.

<Network Apparatus to Transmit a Signal Using an Interference Control Scheme or a Transmission Power Control Scheme>

Figure 11:
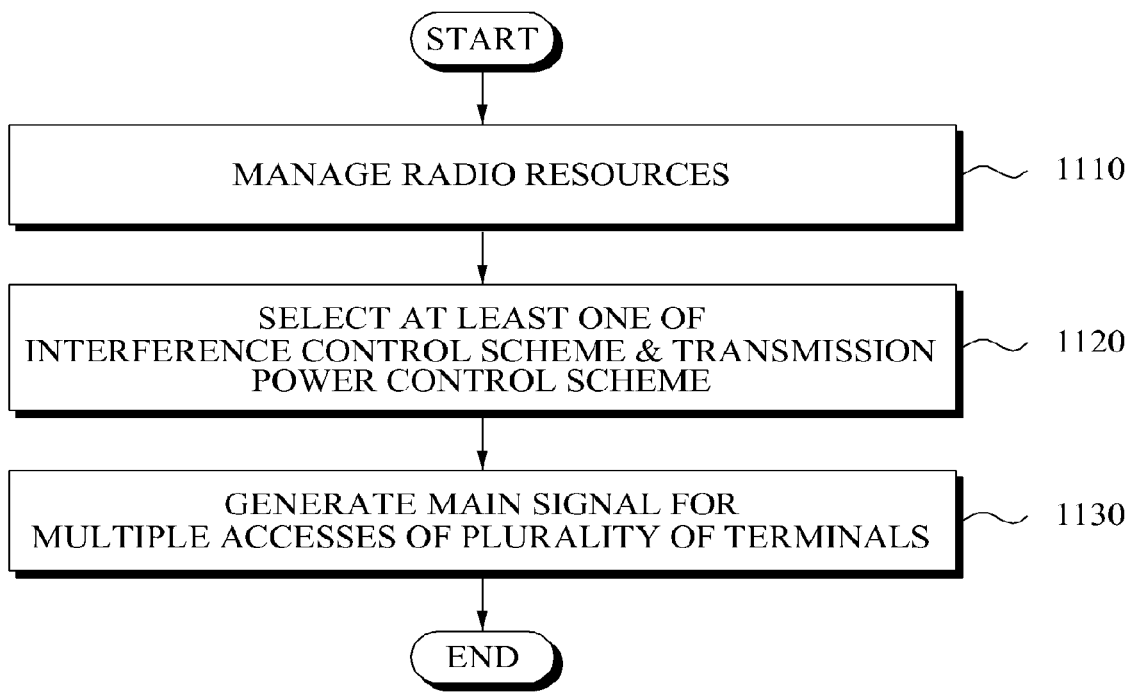
FIG. 11 is a flowchart illustrating an exemplary method of operating a network apparatus to transmit a signal to a terminal by selectively applying either interference control scheme or a transmission power control scheme, or by applying both the interference control scheme and the transmission power control scheme.

FIG. 11 shows a flowchart illustrating an exemplary method of operating a network apparatus to transmit a signal to a terminal by selectively applying either an interference control scheme or a transmission power control scheme, or by applying both the interference control scheme and the transmission power control scheme. The method may be performed by a network apparatus disclosed above. The network apparatus may be configured into a single configuration module that may be included in a base station.

In operation 1110, the network apparatus manages radio resources that are pre-allocated to apply the interference control scheme and radio resources that are pre-allocated to apply the transmission power control scheme. As described above, the interference control scheme may use, for example, one of an interference alignment scheme, an interference neutralization scheme, an interference cancellation scheme, and an ITN scheme. The transmission power control scheme may use, for example, a DSM scheme.

In operation 1120, with respect to a plurality of transmission-reception pairs, the network apparatus selects at least one of the interference control scheme and the transmission power control scheme. In operation 1120, the network apparatus may select at least one of the interference control scheme and the transmission power control scheme by referring to the managed radio resources.

In operation 1130, the network apparatus generates a main signal for multiple accesses of a plurality of terminals, and transmit the generated main signal to the plurality of terminals according to the selection.

Where the interference control scheme is selected in operation S1120, the network apparatus may transmit, to the terminals, a transmission signal where the interference control scheme is applied. Each of the terminals may receive the main signal from the network apparatus corresponding to a main base station, and may also receive an interference signal from an interference base station. Each of the terminals may process the interference signal according to the selected interference control scheme.

<Terminal to Receive a Transmission Signal that is Transmitted Using an Interference Control Scheme or a Transmission Power Control Scheme>

Figure 12:
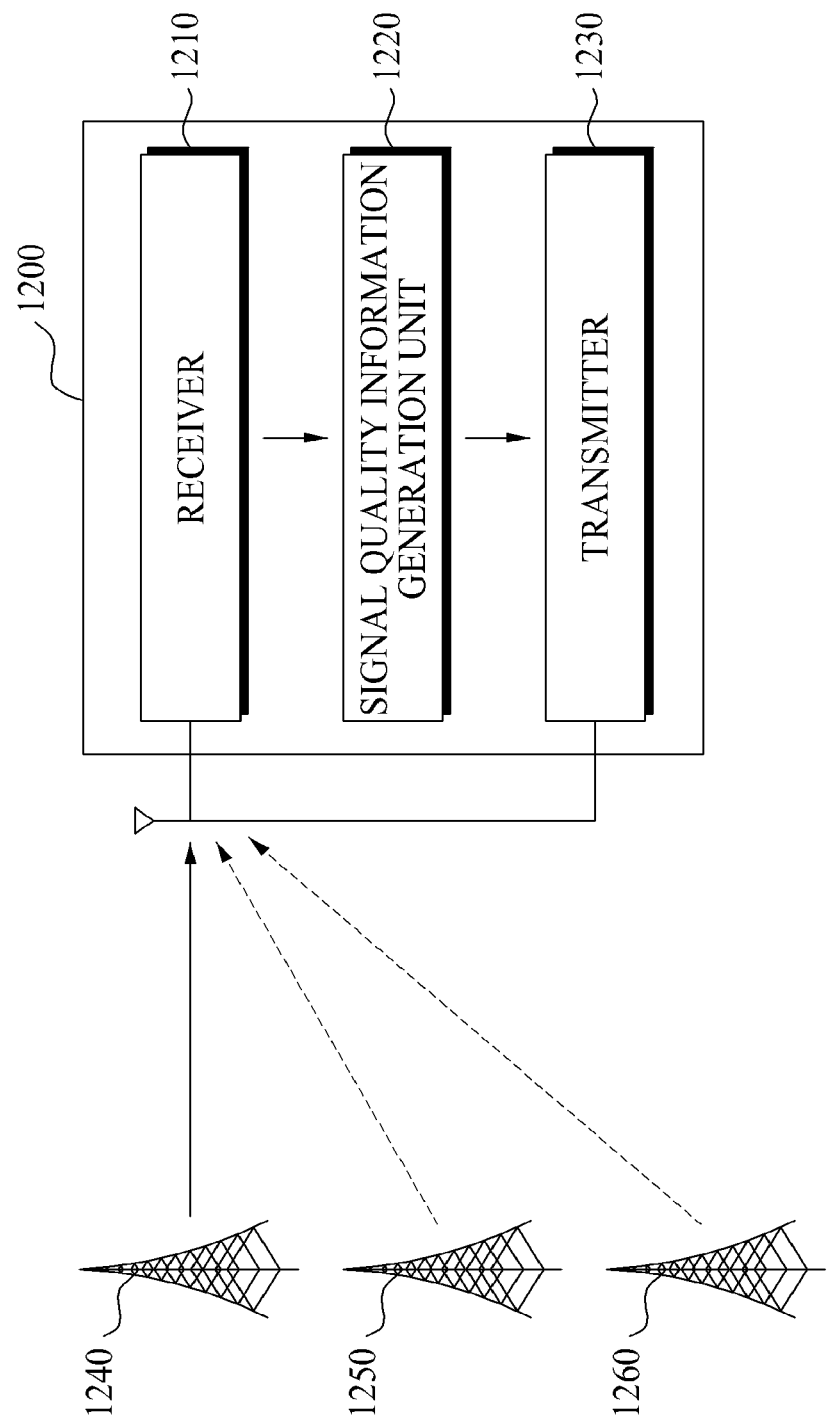
FIG. 12 is a block diagram illustrating a structure of an exemplary terminal to receive a transmission signal that is transmitted using at least one of an interference control scheme and a transmission power control scheme.

FIG. 12 illustrates a structure of an exemplary terminal 1200 to receive a transmission signal that is transmitted using at least one of an interference control scheme, for example, an interference alignment scheme, and a transmission power control scheme.

FIG. 12 illustrates three base stations 1240, 1250, and 1260. Here, it is assumed that the terminal 1200 receives a main signal from the base station 1240. For example, the base station 1240 may correspond to a main base station of the terminal 1200, and the base stations 1250 and 1260 may correspond to interference base stations of the terminal 1200.

The terminal 1200 includes a receiver 1210, a signal quality information generation unit 1220, and a transmitter 1230. The receiver 1210 receives the main signal from the main base station 1240. The receiver 1210 may receive the main signal that is transmitted by applying at least one of the interference control scheme and the transmission power control scheme. The signal quality information generation unit 1220 generates signal quality information to be transmitted to the main base station 1240. Here, the signal quality information may be an SNR or an INR.

The receiver 1210 may receive a pilot signal from each of the base stations 1240, 1250, and 1260. The signal quality information generation unit 1220 may generate signal quality information based on the pilot signal. Also, the signal quality information generation unit 1220 may generate the SNR based on the pilot signal that is received from the main base station 1240. Also, the signal quality information generation unit 1220 may generate the INR based on the pilot signal received from the interference base stations 1250 and 1260.

The signal quality information generation unit 1220 may calculate the signal quality information based on a gain of a radio channel formed between the main base station 1240 and the terminal 1200, a gain of an interference channel formed between the interference base stations 1250 and 1260, and the terminal 1200, a signal transmission power of the main base station 1240, an interference transmission power of the interference base stations 1250 and 1260, and a noise power of the terminal 1200.

The transmitter 1230 transmits the signal quality information to the main base station 1240. The main base station 1240 may apply the interference control scheme for the terminal 1200 based on the signal quality information.

The main base station 1240 may transmit the signal quality information to a base station control unit (not shown). The base station control unit may determine whether to apply the interference control scheme to the terminal 1200. Depending on the decision of the base station control unit, the main base station 1240 may selectively apply the interference control scheme or the transmission power control scheme to the terminal 1200, or may also apply both the interference control scheme and the transmission power control scheme to the terminal 1200.

Where the main base station 1240 transmits a signal to the terminal 1200 using the interference control scheme, for example, the interference alignment scheme, the terminal 1200 may receive, from the interference base stations 1250 and 1260, interference signals of which phases are controlled to be the same as each other.

The receiver 1210 may receive, from the main base station 1240, a control signal that includes information regarding whether to apply the interference control scheme. The terminal 1200 may process the interference signals according to the control signal, and receive the main signal using the interference control scheme.

FIG. 13 shows a flowchart illustrating an exemplary method of operating a terminal to receive a transmission signal that is transmitted using at least one of an interference control scheme and a transmission power control scheme. The method may be performed by a terminal disclosed above.

In operation 1310, each terminal may generate signal quality information associated with a radio channel with each base station. The signal quality information may be an SNR or an INR. Each terminal may receive a pilot signal from each base station and generate the signal quality information. In operation 1320, each terminal may transmit the generated signal quality information to each base station. Each base station may transmit the signal quality information to a base station control unit.

In operation 1330, the terminal receives, from a main base station, a signal that is transmitted by selectively applying the interference control scheme or the transmission power control scheme, or by applying both the interference control scheme and the transmission power control scheme, based on the signal quality information.

In operation 1340, the terminal determines whether the received signal is a signal where the interference control scheme is applied. The terminal may additionally receive information regarding whether the interference control scheme is applied to the signal received from the main base station.

In response to the received signal being the signal where the interference control scheme is applied, the terminal decreases the effect of interference signals in operation 1350. As described above, the interference control scheme may be, for example, one of an interference alignment scheme, an interference neutralization scheme, an interference cancellation scheme, and an ITN scheme. As an example, where the main base station transmit a signal by applying the interference alignment scheme, the terminal may receive, from a plurality of interference base stations, interference signals of which phases are controlled to be the same as each other. The terminal may receive the interference signals with the same phase and effectively cancel or control the interference signals so as to decrease the effect of the interference signals. As another example, the terminal may decrease the effect of the interference signals using, for example, one of the interference neutralization scheme, the interference cancellation scheme, and the ITN scheme.

As an illustration, a terminal described above may be one of a cellular phone, a personal digital assistant (PDA), a digital camera, a portable game console, a portable multimedia player (PMP), a navigation console, and an MP3 player. The terminal may also be for home applications such as a high definition television (HDTV), an optical playback device, a setup box, and the like. The terminal (which is sometimes referred to as a computer terminal) may also be an electronic or electromechanical hardware device that is used to enter and/or display data such as a personal computer, a lab-top, and the like.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A network apparatus comprising:
a receiver configured to receive signal quality information from each of a plurality of base stations, the signal quality information received from each base station indicating the qualities of signals received by terminals that are served by the base station; and
a decision unit configured to determine, based on the signal quality information received from the base stations, whether to apply an interference control scheme to a signal output by a target base station, among the plurality of base stations, that is received by a group of terminals served by plurality of base stations,
wherein the plurality of base stations comprises a first base station, a second base station, and a third base station,
wherein the terminals comprise a first terminal, a second terminal, and a third terminal,
wherein the first base station is configured to receive first information comprising:
a radio channel state between the first base station and the first terminal;
a radio channel state between the first base station and the second terminal; and
a radio channel state between the first base station and the third terminal,
wherein the second base station is configured to receive second information comprising:
a radio channel state between the second base station and the first terminal;
a radio channel state between the second base station and the second terminal; and
a radio channel state between the second base station and the third terminal,
wherein the third base station is configured to receive second information comprising:
a radio channel state between the third base station and the first terminal;
a radio channel state between the third base station and the second terminal; and
a radio channel state between the third base station and the third terminal,
wherein the receiver is configured to receive, from the base stations, the first information, the second information, and the third information, and
wherein the decision unit is further configured to determine, based on the first information, second information, and third information, whether to apply the interference control scheme to the base stations.

2. The network apparatus of claim 1, wherein the communication network includes a plurality of interference base stations and the signal quality information with respect to a terminal designated to receive the signal is calculated based on at least one of:
a gain of a signal channel formed between the designated terminal and a base station serving the designated terminal,
a signal transmission power of the base station serving the designated terminal,
gains of interference channels formed between the interference base stations and the designated terminal,
an interference signal transmission power of each interference base station, and
a noise power of the designated terminal.

3. The network apparatus of claim 1, wherein the interference control scheme is one of an interference alignment scheme, an interference neutralization scheme, an interference cancellation scheme, and an interference treated as noise scheme.

4. The network apparatus of claim 3, wherein the target base station controls a phase of the signal.

5. The network apparatus of claim 1, wherein, in response to the signal quality information being greater than or equal to a predetermined reference value, the decision unit determines to apply the interference control scheme to the signal.

6. The network apparatus of claim 1, wherein, in response to at least two interference signals being received by the group of terminals, the decision unit determines to apply the interference control scheme to the signal.

7. The network apparatus of claim 1, wherein, in response to the decision unit determining to not apply the interference control scheme to the signal, the target base station outputs the signal by applying a transmission power control scheme to the signal.

8. The network apparatus of claim 1, wherein the target base station further applies a transmission power control scheme to the signal to which the interference control scheme is applied.

9. A method, executed by a network apparatus, of transmitting a radio signal in a communication network, the method comprising:
receiving signal quality information from each of a plurality of base stations, the signal quality information received from each base station indicating the qualities of signals received by terminals that are served by the base station; and
determining, based on the signal quality information received from the base stations, whether to apply an interference control scheme to a signal output by a target base station that is received by a group of terminals served by the plurality of base stations,
wherein the plurality of base stations corn rises a first base station a second base station, and a third base station,
wherein the terminals comprise a first terminal, a second terminal, and a third terminal,
wherein the first base station is configured to receive first information comprising:
a radio channel state between the first base station and the first terminal;

a radio channel state between the first base station and the second terminal; and a radio channel state between the first base station and the third terminal, wherein the second base station is configured to receive second information comprising:

a radio channel state between the second base station and the first terminal;

a radio channel state between the second base station and the second terminal; and a radio channel state between the second base station and the third terminal, wherein the third base station is configured to receive second information comprising:

a radio channel state between the third base station and the first terminal;

a radio channel state between the third base station and the second terminal; and a radio channel state between the third base station and the third terminal, wherein the receiver is configured to receive, from the base stations, the first information, the second information, and the third information, and wherein the decision unit is further configured to determine, based on the first information, second information, and third information, whether to apply the interference control scheme to the base stations.

10. The method of claim 9, wherein the communication network includes a plurality of interference base stations and the signal quality information with respect to a designated terminal among the plurality of terminals to receive the signal is calculated based on at least one of:

a gain of a signal channel formed between the base station and the designated terminal, a signal transmission power of the base station, gains of interference channels formed between the interference base stations and the designated terminal, an interference signal transmission power of each interference base station, and a noise power of the designated terminal.

11. The method of claim 9, wherein the interference control scheme is one of an interference alignment scheme, an interference neutralization scheme, an interference cancellation scheme, and an interference treated as noise scheme.

12. The method of claim 9, wherein the target base station controls a phase of the signal.

13. The method of claim 9, wherein the determining comprises determining to apply the interference control scheme to the signal in response to the signal quality information being greater than or equal to a predetermined reference value.

14. The method of claim 9, wherein the determining comprises determining to apply the interference control scheme to the signal in response to at least two interference signals being received by the group of terminals.

15. The method of claim 9, further comprising outputting the signal by applying a transmission power control scheme to the signal in response to determining to not apply the interference control scheme to the signal.

16. The method of claim 9, further comprising outputting the signal, wherein the outputting of the signal comprises:

applying the interference control scheme to the signal in response to determining to apply the interference control scheme; and applying a transmission power control scheme to the signal to which the interference control scheme is applied.

17. A non-transient computer-readable storage medium storing a program to transmit a radio signal in a communication network, the program executed by a computer of a network apparatus and comprising instructions to cause the computer to:

receive signal quality information from each of a plurality of base stations, the signal quality information received from each base station indicating the qualities of signals received by terminals that are served by the base station; and determine, based on the signal quality information received from the base stations, whether to apply an interference control scheme to a signal output by a target base station that is received by a group of terminals served by the plurality of base stations, wherein the plurality of base stations comprises a first base station, a second base station, and a third base station, wherein the terminals comprise a first terminal, a second terminal and a third terminal, wherein the first base station is configured to receive first information comprising:

a radio channel state between the first base station and the first terminal;

a radio channel state between the first base station and the second terminal; and a radio channel state between the first base station and the third terminal, wherein the second base station is configured to receive second information comprising:

a radio channel state between the second base station and the first terminal;

a radio channel state between the second base station and the second terminal; and a radio channel state between the second base station and the third terminal, wherein the third base station is configured to receive second information comprising:

a radio channel state between the third base station and the first terminal;

a radio channel state between the third base station and the second terminal; and a radio channel state between the third base station and the third terminal, wherein the receiver is configured to receive, from the base stations, the first information, the second information, and the third information, and wherein the decision unit is further configured to determine, based on the first information, second information, and third information, whether to apply the interference control scheme to the base stations.

18. The network apparatus of claim 1, wherein the interference control scheme is a neutralization control scheme, such that a phase of a first interference signal from the second base station to the first terminal is an opposite of a phase of a second interference signal from the third base station to the first terminal, and such that the first interference signal and the second interference signal combine to form a single interference signal with a relatively smaller magnitude.

* * * * *